(12) United States Patent
Shioda et al.

(10) Patent No.: US 7,141,336 B2
(45) Date of Patent: Nov. 28, 2006

(54) HOLOGRAM TRANSFER FILM

(75) Inventors: Satoshi Shioda, Shinjuku-Ku (JP);
 Mikiko Hojo, Shinjuku-Ku (JP);
 Hiroyuki Otaki, Shinjuku-Ku (JP);
 Kenji Ueda, Shinjuku-Ku (JP); Tetsuya Toshine, Shinjuku-Ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 38 days.

(21) Appl. No.: 10/265,605

(22) Filed: Oct. 8, 2002

(65) Prior Publication Data
US 2003/0124436 A1   Jul. 3, 2003

Related U.S. Application Data

(63) Continuation of application No. 09/487,347, filed on Jan. 19, 2000, now Pat. No. 6,495,295.

(30) Foreign Application Priority Data

Jan. 19, 1999 (JP) .................. 11-010475
Jan. 19, 1999 (JP) .................. 11-010476

(51) Int. Cl.
 *G03H 1/04* (2006.01)
(52) U.S. Cl. .............. 430/1; 430/2; 283/86; 156/234; 359/2
(58) Field of Classification Search .......... 430/1, 430/2; 369/2, 3; 283/86; 264/1.31, 1.36, 264/1.38, 1.6
 See application file for complete search history.

(56) References Cited

U.S. PATENT DOCUMENTS

| | | | |
|---|---|---|---|
| 3,882,207 A | 5/1975 | Hannan et al. | 264/1.32 |
| 4,856,857 A | 8/1989 | Takauchi et al. | 283/86 |
| 4,913,504 A | 4/1990 | Gallagher | 359/2 |
| 5,003,915 A | 4/1991 | D'Amato et al. | 264/1.31 |
| 5,085,514 A | 2/1992 | Mallik et al. | 283/86 |
| 5,098,803 A | 3/1992 | Monroe et al. | 430/1 |
| 5,300,169 A | 4/1994 | Tahara | 430/1 |
| 5,470,662 A | 11/1995 | Weber et al. | 430/1 |
| 5,801,857 A | 9/1998 | Heckenkamp et al. | 359/2 |
| 5,843,598 A * | 12/1998 | Ueda et al. | 430/2 |
| 6,596,360 B1 * | 7/2003 | Toshine et al. | 428/40.1 |
| 6,994,937 B1 * | 2/2006 | Toshine et al. | 430/1 |
| 7,018,744 B1 * | 3/2006 | Otaki et al. | 430/1 |
| 2002/0015897 A1 * | 2/2002 | Toshine et al. | 430/2 |
| 2004/0253521 A1 * | 12/2004 | Otaki et al. | 430/1 |

FOREIGN PATENT DOCUMENTS

| | | |
|---|---|---|
| CA | 2046711 | 1/1992 |
| EP | 0229645 | 7/1987 |
| EP | 0 291 928 | 11/1988 |
| EP | 0 466 118 | 1/1992 |
| EP | 0 869 408 | 10/1998 |
| JP | 58-144878 | 8/1983 |

(Continued)

*Primary Examiner*—Martin Angerbranndt
(74) *Attorney, Agent, or Firm*—Oliff & Berridge, PLC

(57) ABSTRACT

Disclosed is a hologram transfer film which can realize easy and good transfer of a hologram and, at the same time, can realize stable transfer of the hologram in a transfer process. The hologram transfer film comprises: a substrate film; and a transfer layer provided on the substrate film, the transfer layer comprising a hologram-forming layer and a heat-sensitive adhesive layer provided in that order on the substrate film, the hologram-forming layer having a breaking strain of 0.5 to 15% at 25° C. and a breaking strain of 0.5 to 30% at 120° C.

15 Claims, 3 Drawing Sheets

FOREIGN PATENT DOCUMENTS

| | | |
|---|---|---|
| JP | 63-137287 | 6/1988 |
| JP | 62-106485 | 5/1997 |
| JP | 10-071759 | 3/1998 |
| JP | 10-251999 | 9/1998 |
| WO | WO 94/18609 | 8/1994 |

* cited by examiner

HOLOGRAM TRANSFER FILM

TECHNICAL FIELD

The present invention relates to a hologram transfer film with good hologram transferability which can easily apply a hologram to various objects.

The present invention also relates to a production process of a hologram transfer film suitable for small lot production of a plurality of kinds of products with high efficiency.

The present invention further relates to a photocurable resin composition and a hologram and a forgery-preventing sheet using the photocurable resin composition, and more particularly to a photocurable resin composition, which can yield a coating having simultaneously heat resistance, softness and other properties, and a hologram and a forgery-preventive sheet, with the hologram being infused therein as a lustrous thread, using the resin composition.

BACKGROUND ART

In conventional hologram transfer films, in general, a surface relief hologram layer, wherein a hologram is formed by providing concaves and covexes on the surface thereof, is mainly used in a hologram-forming layer. A representative construction of the hologram transfer film known in the art comprises a substrate film having thereon a release layer, a surface relief hologram layer, a reflective thin film layer, and a heat-sensitive adhesive layer.

At the time of thermal transfer, in other words, hot stamping, the hologram layer in the hologram transfer film should be sharply cut and transferred onto an object, that is, should have good transferability and should be exactly transferred onto an object.

Many of the conventional hologram transfer films, however, have unsatisfactory hologram transferability, and are very unstable in transfer process. That is, the hologram layer can be in some cases satisfactorily transferred and in some cases cannot be satisfactorily transferred. Therefore, an improvement in the transferability has been desired in the art.

Accordingly, it is a first object of the present invention to provide a hologram transfer film which can solve the above problem of the prior art and enables a hologram to be easily and exactly transferred with good stability in the transfer process.

An example of a conventional forgery-preventive sheet is such that a forgery-preventive printed pattern (a ground design) is formed by printing fine dots or hairlines on the surface of the sheet. In this sheet, upon copying in a light mode, the dots or the lines cannot be clearly copied, while upon copying in a deep mode, the dots are blurred and seen like lines or letters, and the lines are blurred to thicken the lines. In recent years, however, this method has become insufficient for preventing forgery.

In order to solve this problem, a forgery-preventive sheet has been proposed wherein, for example, a lustrous thread is infused into one side of a base sheet (Japanese Patent Laid-Open No. 56377/1995). This forgery-preventive sheet is intended to prevent forgery by utilizing a phenomenon such that, even upon color copying, a metallic color does not appear in portions corresponding to the lustrous thread.

Further, diffraction gratings or relief holograms have hitherto been used for the decoration or the prevention of forgery of various cards, securities and the like.

With expansion of the above applications, the diffraction grating or the relief hologram has become required to have such properties as the capability of being infused as watermarks into papers, excellent strength, heat resistance, scratch resistance, water resistance, chemical resistance, and adhesion to substrates, and conformability to flexing or expansion/contraction of objects with holograms or diffraction gratings being applied thereon. In particular, in the case of diffraction gratings or relief holograms formed of a cured product of a conventional photocurable coating composition, a resin used in the production thereof loses flexibility upon photocuring, and, thus, flexing or expansion/contraction of an object with the holograms or the diffraction grating being applied thereon results in loss of the function of the diffraction grating or the relief hologram.

Accordingly, it is a second object of the invention to provide a photocurable resin composition that can form a diffraction grating, a hologram or the like which can solve the problems of the prior art and has excellent strength, heat resistance, scratch resistance, water resistance, chemical resistance, and adhesion to substrates, and conformability to flexing or expansion/contraction of objects with holograms or diffraction gratings being applied thereon, and to provide a hologram or diffraction grating sheet.

DISCLOSURE OF THE INVENTION

According to the first invention, there is provided a hologram transfer film comprising: a substrate film; a transfer layer provided on the substrate film, the transfer layer comprising a hologram-forming layer and a heat-sensitive adhesive layer provided in that order on the substrate film, the hologram-forming layer having a breaking strain of 0.5 to 15% at 25° C. and a breaking strain of 0.5 to 30% at 120° C. The present inventor has found that the transferability is influenced by strain at break of the hologram-forming layer, which had led to the completion of the present invention.

A process for producing the hologram transfer film according to the first invention comprises the steps of: providing a film having a hologram-forming layer and a film having a heat-sensitive adhesive layer in respective independent steps; and then laminating these films in combination according to applications of the hologram to prepare the hologram transfer film. According to this production process, mere lamination of a film having a hologram-forming layer and a film having a heat-sensitive adhesive layer, which have already been produced in respective independent steps, in combination according to need can provide a hologram transfer film. Therefore, this production process is particularly suitable for small lot production of a plurality of kinds of products.

In order to attain the second object, the present inventor has made further studies on material systems proposed by the present applicant in Japanese Patent Laid-Open No. 156273/1986 and Japanese Patent Publication No. 54502/1993, and, as result, has found that this object can be attained by regulating the Young's modulus at 1% elongation of cured products of photocurable resin compositions using these materials to a specific range. This had led to the completion of the second invention.

Thus, according to the second invention, there are provided a photocurable resin composition for providing a formative layer formed of a hologram or a diffraction grating on a substrate having a Young's modulus at 1% elongation of not less than 2,000 MPa at 25° C. and a Young's modulus at 1% elongation of not less than 350 MPa at 120° C., wherein the photocurable resin composition provides a cured product of which the Young's modulus at 1% elongation at 25° C. and the Young's modulus at 1% elongation at 120° C. are respectively lower than those of the substrate, and a hologram or diffraction grating sheet comprising: a substrate film; a formative layer formed of a hologram or a diffraction grating provided on the substrate film; and a pressure-sensitive adhesive layer provided on the formative layer, the formative layer having Young's modulus at 1% elongation at 25° C. and the Young's modulus at 1% elongation at 120° C. respectively lower than those of the substrate.

BEST MODE FOR CARRYING OUT THE INVENTION

First Invention

The present invention will be described in more detail with reference to the accompanying drawings.

Figure 1:
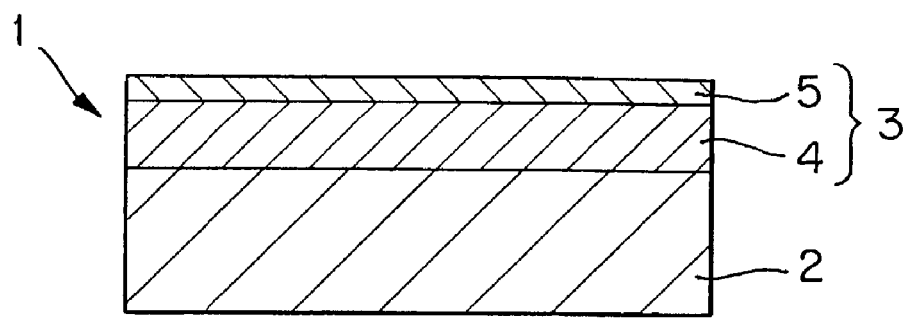
FIG. 1 is a schematic cross-sectional view showing a basic form of a hologram transfer film.

FIG. 1 shows a cross-sectional view of a basic form of the hologram transfer film according to the present invention. Specifically, as shown in FIG. 1, a hologram transfer film 1 according to the present invention comprises: a substrate film 2; and a hologram-forming layer 4 and a heat-sensitive adhesive layer 5 laminated in that order on the substrate film 2 to constitute a transfer layer 3. The hologram-forming layer 4 is characterized by having a breaking strain at 25° C. of 0.5 to 15% and a breaking strain at 120° C. of 0.5 to 30%. When the breaking strain is in the above range, the transferability of the hologram is good.

Figure 2:
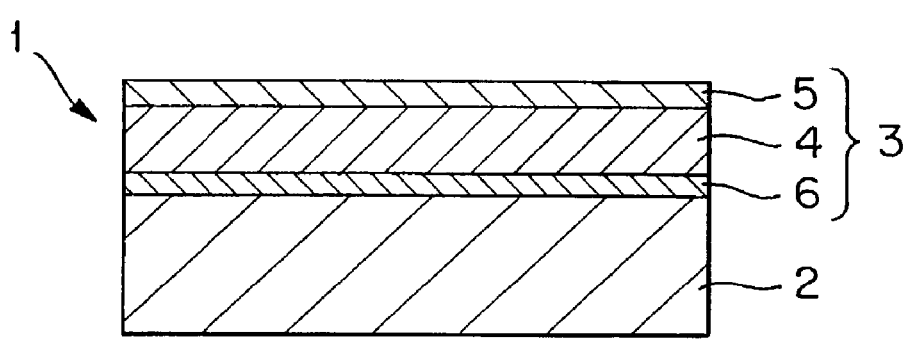
FIG. 2 is a schematic cross-sectional view of a hologram transfer film having the same layer construction as the hologram transfer film shown in FIG. 1, except that a release layer is additionally provided.
Figure 3:
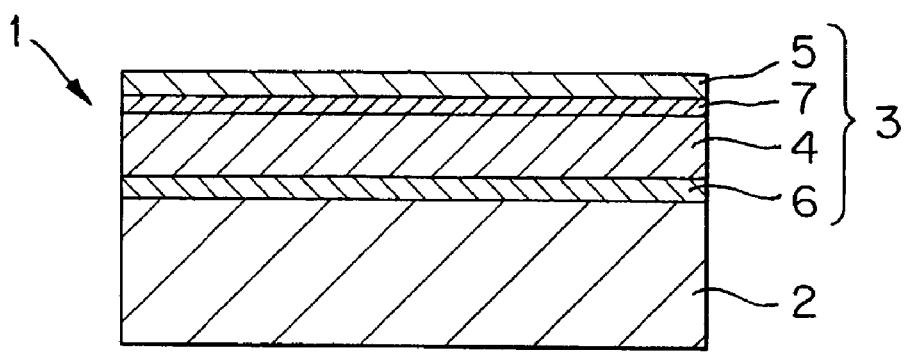
FIG. 3 is a schematic cross-sectional view of a surface relief hologram transfer film having the same layer construction as the hologram transfer film shown in FIG. 1, except that a reflective layer is additionally provided.

According to the transfer film of the present invention, as shown in FIG. 2, the provision of a release layer 6 between the substrate film 2 and the hologram-forming layer 4 is preferred from the viewpoint of attaining the effect of enhancing the releasability of the transfer layer 3 from the substrate film 2 at the time of thermal transfer. When the adhesion between the release layer 6 and the hologram-forming layer 4 is low, a layer for improving the adhesion may be provided. When the hologram-forming layer 4 is a surface relief hologram layer, as shown in FIG. 3, a reflective layer 7 may be provided between the hologram-forming layer 4 and the heat-sensitive adhesive layer 5.

Next, the substrate film and materials for respective layers, which constitute the hologram transfer film of the present invention, will be described.

Examples of the substrate film 2 include films of polyethylene terephthalate (PET), polyvinyl chloride (PVC), polyvinylidene chloride, polyethylene, polypropylene, polycarbonate, cellophane, acetate, nylon, polyvinyl alcohol, polyamide, polyamide-imide, ethylene-vinyl alcohol copolymer, polymethyl methacrylate (PMMA), polyether sulfone, and polyether ether ketone (PEEK). The thickness of the substrate film 2 is generally about 5 to 200 μm, preferably 10 to 50 μm.

When the hologram-forming layer 4 is a surface relief hologram-forming layer, a surface relief hologram may be formed, for example, by coating a surface relief hologram-forming material on a substrate typified by the substrate film 2 and heat-pressing the surface of the forming material by means of a press stamper, which has been prepared continuously from a master hologram prepared using a laser beam, to form a fine concave-convex pattern.

Materials for the surface relief hologram-forming material usable herein include, but are not particularly limited to, various resin materials, which have hitherto been used as materials for relief hologram-forming layers, such as thermosetting resins, thermoflexible resins, and ionizing radiation-curable resins. Thermosetting resins include, for example, unsaturated polyester resins, acryl-modified urethane resins, epoxy-modified acrylic resins, epoxy-modified unsaturated polyester resins, alkyd resins, and phenolic resins. Thermoflexible resins include, for example, acrylic ester resins, acrylamide resins, nitrocellulose resins, and polystyrene resins. These resins may be homopolymers or copolymers of two or more components. Further, these resins may be used alone or in combination of two or more. Any suitable material may be selected from the following materials and compounded in these resins: various isocyanate compounds; metallic soaps, such as cobalt naphthenate and zinc naphthenate; organic peroxides, such as benzoyl peroxide and methyl ethyl ketone peroxide; and heat or ultraviolet curing agents, such as benzophenone, acetophenone, anthraquinone, naphthoquinone, azobisisobutyronitrile, and diphenyl sulfide.

Ionizing radiation-curable resins include, for example, epoxy-modified acrylate resins, urethane-modified acrylate resins, and acryl-modified polyesters. Among them, urethane-modified acrylate resins are particularly preferred. Urethane-modified acrylic resins represented by the following formula are particularly preferred:

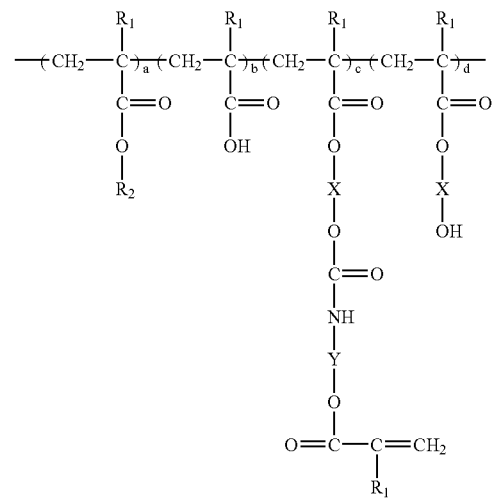

wherein five $R_1$'s each independently represent a hydrogen atom or a methyl group; $R_2$ represents a $C_1$–$C_{16}$ hydrocarbon group; X and Y each represent a straight-chain or branched alkylene group; and, with the sum of a, b, c, and d being 100, a is an integer of 20 to 90, b is an integer of 0 to 50, c is an integer of 10 to 80, and d is an integer of 0 to 20.

A preferred example of the urethane-modified acrylic resin is an acrylic copolymer produced by copolymerizing 20 to 90 moles of methyl methacrylate with 0 to 50 moles of methacrylic acid and 10 to 80 moles of 2-hydroxyethyl methacrylate. In this copolymer, hydroxyl groups present in the copolymers have been reacted with methacryloyloxyethyl isocyanate (2-isocyanate ethyl methacrylate).

Therefore, the copolymer is not required to be in such a state that all the hydroxyl groups present in the copolymer have been reacted with the methacryloyloxyethyl isocyanate. More specifically, the copolymer may be in such a state that at least 10% by mole, preferably not less than 50% by mole, of the hydroxyl groups in 2-hydroxyethyl methacrylate units have been reacted with the methacryloyloxyethyl isocyanate. Hydroxyl-containing monomers, such as N-methylolacrylamide, N-methylolmethacrylamide, 2-hydroxyethyl acrylate, 2-hydroxyethyl methacrylate, 2-hydroxypropyl acrylate, 2-hydroxypropyl methacrylate, 4-hydroxybutyl acrylate, and 4-hydroxybutyl methacrylate, may be used instead of or in combination with the 2-hydroxyethyl methacrylate.

Thus, for example, when the formation of diffraction gratings and the like is contemplated, the resin composition composed mainly of a urethane-modified acrylic resin with a large number of methacryloyl groups being introduced into the molecule through the utilization of hydroxyl groups present in a hydroxyl-containing acrylic resin enables ionizing radiations, such as ultraviolet light and electron beams, to be used as curing means and, in addition, can form diffraction gratings and the like possessing excellent softness, heat resistance and other properties despite high crosslink density.

In the preparation of the urethane-modified acrylic resin, the copolymer may be dissolved in a solvent capable of dissolving the copolymer, for example, toluene, ketone, cellosolve acetate, or dimethyl sulfoxide, to prepare a solution, to which methacryloyloxyethyl isocyanate is added dropwise with stirring of the solution to react isocyanate groups with hydroxyl groups in the acrylic resin to form a urethane bond, thereby introducing methacryloyl groups into the resin through the urethane bond. In this case, the amount of methacryloyloxyethyl isocyanate used is such that the ratio of the isocyanate group to the hydroxyl group in the acrylic resin is 0.1 to 5 moles, preferably 0.5 to 3 moles, of the isocyanate group per mole of the hydroxyl group. When the amount of methacryloyloxyethyl isocyanate used is one equivalent or more based on the amount of the hydroxyl group in the resin, there is a possibility that the methacryloyloxyethyl isocyanate is also reacted with carboxyl groups in the resin to create linkage of —CONH—CH$_2$CH$_2$—.

The above embodiment is such that, in the above formula, all $R_1$'s and $R_2$'s represent a methyl group and X and Y each represent an ethylene group. The present invention, however, is not limited to this embodiment. Specifically, five $R_1$'s each independently may represent a hydrogen atom or a methyl group. Further, specific examples of $R_2$ include methyl, ethyl, n- or iso-propyl, n-, iso-, or t-butyl, substituted or unsubstituted phenyl, and substituted or unsubstituted benzyl groups. Specific examples of X and Y include ethylene, propylene, diethylene, and dipropylene groups. The molecular weight of the whole urethane-modified acrylic resin, thus obtained, to be used in the present invention is preferably 10,000 to 200,000, more preferably 20,000 to 40,000, as measured by gel permeation chromatography (GPC) using polystyrene as a standard.

In curing the ionizing radiation-curable resin, the monomer may be used in combination with the following monofunctional or polyfunctional monomers, oligomers and the like from the viewpoint of regulating the crosslinked structure and the viscosity.

Examples of monofunctional monomers usable herein include mono(meth)acrylates, such as tetrahydrofurfuryl (meth)acrylate, hydroxyethyl (meth)acrylate, vinylpyrrolidone, (meth)acryloyloxyethyl succinate, (meth)acryloyloxyethyl phthalate, and examples of bifunctional or higher monomers usable herein include, when classified according to skeleton structure, polyol (meth)acrylates (such as epoxy-modified polyol (meth)acrylate and lactone-modified polyol (meth)acrylate), polyester (meth)acrylate, epoxy (meth)acrylate, urethane (meth)acrylate, and other poly(meth)acrylates having polybutadiene, isocyanuric acid, hydantoin, melamine, phosphoric acid, imide, phosphazene and other skeletons. That is, various ultraviolet- or electron beam-curable monomers, oligomers, and polymers are usable.

More specifically, examples of bifunctional monomers and oligomers include polyethylene glycol di(meth)acrylate, polypropylene glycol di(meth)acrylate, neopentyl glycol di(meth)acrylate, and 1,6-hexanediol di(meth)acrylate; examples of trifunctional monomers, oligomers, and polymers include trimethylolpropane tri(meth)acrylate, pentaerythritol tri(meth)acrylate, and aliphatic tri(meth)acrylate; examples of tetrafunctional monomers and oligomers include pentaerythritol tetra(meth)acrylate, ditrimethylolpropane tetra(meth)acrylate, and aliphatic tetra(meth)acrylate; and examples of pentafunctional or higher monomers and oligomers include dipentaerythritol penta(meth)acrylate, dipentaerythritol hexa(meth)acrylate and, in addition, (meth)acrylates having a polyester skeleton, a urethane skeleton, and phosphazene skeleton. The number of functional groups is not particularly limited. However, when the number of functional groups is less than 3, the heat resistance is likely to lower. On the other hand, when the number of functional groups is 20 or more, the softness is likely to lower. For this reason, the number of functional groups is particularly preferably 3 to 20.

In forming a relief hologram in the hologram-forming layer comprising the above materials, a press stamper having concaves and convexes is pressed against the surface of the hologram-forming layer to form concaves and convexes on the surface of the holorgam-forming layer. In this connection, a release agent may be previously incorporated into the hologram-forming layer so that the hologram-forming layer can be easily separated from the press stamper. Release agents usable herein include conventional release agents, for example, solid waxes, such as polyethylene wax, amide wax, and Teflon powder, surfactants, such as fluorine and phosphoric ester surfactants, and silicones. Particularly preferred release agents are modified silicones, and specific examples thereof include:

1) silicone oils of side chain modification type;
2) silicone oils of both ends modification type;
3) silicone oils of one end modification type;
4) silicone oils of side chain and both ends modification type;
5) methylpolysiloxanes containing trimethylsiloxy-silicic acid (hereinafter referred to as "silicone resin");
6) silicone-grafted acrylic resins; and
7) methylphenylsilicone oils.

Modified silicone oils are classified into reactive silicone oils and nonreactive silicone oils.

Reactive silicone oils include amino-modified, epoxy-modified, carboxyl-modified, carbinol-modified, methacryl-modified, mercapto-modified, phenol-modified, and one-end reactive, and dissimilar functional group-modified silicone oils.

Nonreactive silicone oils include polyether-modified, methylstyryl-modified, alkyl-modified, higher fatty acid ester-modified, hydrophilic group-modified, higher alkoxy-modified, higher fatty acid-modified, and fluorine-modified silicone oils.

Among the above silicone oils, reactive silicone oils of the type having a group reactive with the film-forming component in the hologram-forming layer is reacted with the component in the course of curing of the hologram-forming layer, and bonded to the component, and, therefore, can impart unique properties to the hologram-forming layer without bleeding on the surface of the hologram-forming layer on which a concave-convex pattern is formed later. They are particularly effective in improving the adhesion to a deposit layer formed in the step of vapor deposition.

The thickness of the surface relief hologram layer is generally 0.1 to 50 μm, preferably 1 to 20 μm.

When the hologram-forming layer 4 is a volume hologram-forming layer, the volume hologram may be formed by coating a volume hologram-forming material on a support film and recording interference fringes, corresponding to a wave front of light from an object, in the form of transmittance modulation or refractive index modulation within the hologram-forming layer. Further, duplication can be easily carried out by intimately contacting an original plate for a volume hologram with the hologram-forming layer and then conducting exposure and development.

Volume hologram layer-forming materials usable herein include all conventional volume hologram-recording materials, such as silver salt materials, bichromated gelatin emulsions, photopolymerizable resins, and photocrosslinkable resins. A photosensitive material, for dry volume phase hologram recording applications, comprising a matrix polymer, a photopolymerizable compound, a photopolymerization initiator, and a sensitizing dye is particularly preferred.

Photopolymerizable compounds include photopolymerizable, photocrosslinkable monomers, oligomers, and prepolymers having at least one ethylenically unsaturated bond per molecule which will be described later, and mixtures of the above compounds, for example, unsaturated carboxylic acids and salts thereof, esters of unsaturated carboxylic acids with aliphatic polyhydric alcohols, and compounds in which unsaturated carboxylic acids are linked to aliphatic polyamine compounds by an amide linkage.

Specific examples of monomers of unsaturated carboxylic acids include acrylic acid, methacrylic acid, itaconic acid, crotonic acid, isocrotonic acid, maleic acid, and halogen-substituted unsaturated carboxylic acids, for example, chlorinated unsaturated carboxylic acids, brominated unsaturated carboxylic acids, and fluorinated unsaturated carboxylic acids. Salts of unsaturated carboxylic acids include sodium and potassium salts of the above acids.

Regarding specific examples of monomers of esters of aliphatic polyhydric alcohols with unsaturated carboxylic acids, acrylic esters include ethylene glycol diacrylate, triethylene glycol diacrylate, 1,3-butanediol diacrylate, tetramethylene glycol diacrylate, propylene glycol diacrylate, neopentyl glycol diacrylate, trimethylolpropane triacrylate, trimethylolpropane tri(acryloyloxypropyl) ether, trimethylolethane triacrylate, hexanediol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol hexaacrylate, sorbitol triacrylate, sorbitol tetraacrylate, sorbitol pentaacrylate, sorbitol hexaacrylate, tri(acryloyloxyethyl) isocyanurate, polyester acrylate oligomer, 2-phenoxyethyl acrylate, 2-phenoxyethyl methacrylate, phenol ethoxylate monoacrylate, 2-(p-chlorophenoxy)ethyl acrylate, p-chlorophenyl acrylate, phenyl acrylate, 2-phenylethyl acrylate, (2-acryloxyethyl) ether of bisphenol A, ethoxylated bisphenol A diacrylate, 2-(1-naphthyloxy)ethyl acrylate, o-biphenyl methacrylate, and o-biphenyl acrylate.

Methacrylic esters include tetramethylene glycol dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis-[p-(3-methacryloxy-2-hydroxypropoxy)phenyl]-dimethylmethane, bis-[p-(acryloxyethoxy)phenyl]-dimethylmethane, 2,2-bis(4-methacryloyloxyphenyl) propane, and 2-naphthyl methacrylate.

Itaconic esters include ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate.

Crotonic esters include ethylene glycol dicrotonate, tetramethylene glycol dicrotonate, pentaerythritol dicrotonate, and sorbitol tetracrotonate.

Isocrotonic esters include ethylene glycol diisocrotonate, pentaerythritol diisocrotonate, and sorbitol tetraisocrotonate.

Maleic esters include ethylene glycol dimaleate, triethylene glycol dimaleate, pentaerythritol dimaleate, and sorbitol tetramaleate.

Halogenated unsaturated carboxylic acids usable herein include 2,2,3,3-tetrafluoropropyl acrylate, 1H,1H,2H,2H-heptadecafluorodecyl acrylate, 2,2,3,3-tetrafluoropropyl methacrylate, 1H,1H,2H,2H-heptadecafluorodecyl methacrylate, 2,4,6-tribromophenyl methacrylate, dibromoneopentyl dimethacrylate (NK Ester DBN (tradename), manufactured by Shin-Nakamura Chemical Co., Ltd.), dibromopropyl acrylate (NK Ester A-DBP (tradename), manufactured by Shin-Nakamura Chemical Co., Ltd.), dibromopropyl methacrylate (NK Ester DBP (tradename), manufactured by Shin-Nakamura Chemical Co., Ltd.), methacrylic acid chloride, 2,4,6-trichlorophenyl methacrylate, p-chlorostyrene, methyl 2-chloroacrylate, ethyl 2-chloroacrylate, n-butyl-2-chloroacrylate, tribromophenol acrylate, and tetrabromophenol acrylate.

Specific examples of monomers of compounds, in which unsaturated carboxylic acids are linked to aliphatic polyamine compounds by an amide linkage, include methylenebisacrylamide, methylenebismethacrylamide, 1,6-hexamethylenebisacrylamide, 1,6-hexamethylenebismethacrylamide, diethylenetriamine trisacrylamide, xylylenebisacrylamide, xylylenebismethacrylamide, N-phenylmethacrylamide, and diacetoneacrylamide.

Other examples include polyisocyanate compounds having two or more isocyanate groups per molecule described in Japanese Patent Publication No. 41708/1973 and vinyl urethane compounds having two or more polymerizable vinyl groups per molecule with a hydroxyl-containing vinyl monomer represented by formula (1) being added thereto.

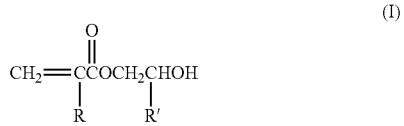

wherein R and R' each independently represent a hydrogen or a methyl group.

Urethane acrylates described in Japanese Patent Laid-Open No. 37193/1976 and polyester acrylates and polyfunctional acrylates and methacrylates, prepared from epoxy resin and (meth)acrylic acid or the like, described in Japanese Patent Laid-Open No. 64183/1973 and Japanese Patent Publication Nos. 43191/1974 and 30490/1977 may also be used.

Further, compounds introduced as photocurable monomers and oligomers in Journal of the Adhesion Society of Japan, Vol. 20, No. 7, 300–308 (1984) may also be used.

Regarding other examples, phosphorus-containing monomers include: mono(2-acryloyloxyethyl) acid phosphate (Light Ester PA (tradename), manufactured by Kyoeisha Chemical Co., Ltd.) and mono(2-methacryloyloxyethyl) acid phosphate (Light Ester PM (tradename), manufactured by Kyoeisha Chemical Co., Ltd.); and epoxy acrylate monomers (Ripoxy VR-60(tradename), manufactured by Showa High Polymer Co., Ltd.; and Ripoxy VR-90 (tradename), manufactured by Showa High Polymer Co., Ltd.).

Further, NK Ester M-230G (tradename) manufactured by Shin-Nakamura Chemical Co., Ltd. and NK Ester 23G (tradename) manufactured by Shin-Nakamura Chemical Co., Ltd. are usable.

Further examples of monomers include: triacrylates represented by formulae (2) and (3):

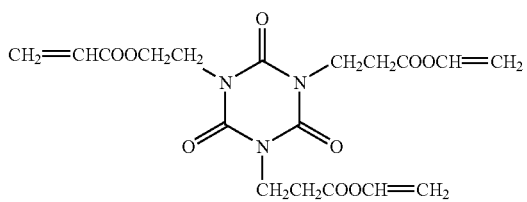

(Aronix M-315, manufactured by Toa Gosei Chemical Industry Co., Ltd.)

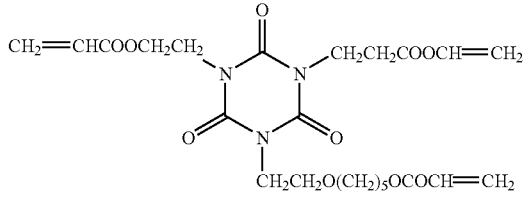

(Aronix M-325, manufactured by Toa Gosei Chemical Industry Co., Ltd.); 2,2'-bis(4-acryloxydiethoxyphenyl)propane (NK Ester A-BPE-4 (tradename), manufactured by Shin-Nakamura Chemical Co., Ltd.); and tetramethylolmethane tetraacrylate (NK ester A-TMMT (tradename) manufactured by Shin-Nakamura Chemical Co., Ltd.).

Examples of plasticizers, which may be optionally added, include: polyhydric alcohols, such as ethylene glycol, diethylene glycol, triethylene glycol, glycerin, and trimethylolpropane; phthalic ester plasticizers, such as dimethyl phthalate (DMP), diethyl phthalate (DEP), dibutyl phthalate (DBP), heptylnonyl phthalate (HNP), di-2-ethylhexyl phthalate (DOP), di-n-octyl phthalate (DNOP), di-1-octyl phthalate (DCapP), (79 alkyl) phthalate (D79P), di-1-decyl phthalate (DIDP), ditridecyl phthalate (DTDP), dicyclohexyl phthalate (DCHP), butylbenzyl phthalate (BDP), ethylphthalylethyl glycolate (EPEG), and butylphthalylbutyl glycolate (BPBG); aliphatic dibasic acid ester plasticizers, such as di-2-ethylhexyl adipate (DOA), di-(methylcyclohexyl) adipate, diisodecyl adipate (DIDA), di-n-hexyl azelate (DNHZ), di-2-ethylhexyl azelate (DOZ), dibutyl sebacate (DBS), and di-2-ethylhexyl sebacate (DOS); citric ester plasticizers, such as triethyl citrate (TEC), tributyl citrate (TBC), triethyl acetylcitrate (ATEC), and tributyl acetylcitrate (ATBC); epoxy plasticizers, such as epoxidized soybean oil; and phosphoric ester plasticizers, such as tributyl phosphate (TBP), triphenyl phosphate (TPP), tricresyl phosphate (TCP), and tripropylene glycol phosphate.

Regarding initiator systems, photopolymerization initiators include, for example, 1,3-di(t-butyldioxycarbonyl)benzophenone, 3,3',4,4'-tetrakis(t-butyldioxycarbonyl)benzophenone, N-phenylglycine, 2,4,6-tris(trichloromethyl)-s-triazine, 3-phenyl-5-isoxazolone, 2-mercaptobenzimidazole, and dimers of imidazole. Preferably, the photopolymerization initiator is decomposed after recording of the hologram from the viewpoint of stabilizing the recorded hologram. An organic peroxide system is preferred because it can be easily decomposed upon ultraviolet irradiation.

Examples of sensitizing dyes include dyes having absorption of light at 350 to 600 nm, such as thiopyrilium salt, merocyanine, quinoline, styrylquinoline, ketocoumarin, thioxanthene, xanthene, oxonol, cyanine, rhodamine, thiopyrilium salt, pyrilium ion, and diphenyliodonium ion dyes. Sensitizing dyes having absorption of light in a wavelength region of not more than 350 nm or not less than 600 nm may also be used. Matrix polymers usable herein include polymethacrylic esters or partial hydrolyzates thereof, polyvinyl acetate or hydrolyzates thereof, polyvinyl alcohol or partial acetalization products thereof, triacetylcellulose, polyisoprene, polybutadiene, polychloroprene, silicone rubber, polystyrene, polyvinyl butyral, polychloroprene, polyvinyl chloride, chlorinated polyethylene, chlorinated polypropylene, poly-N-vinylcarbazole or derivatives thereof, poly-N-vinylpyrrolidone or derivatives thereof, copolymer of styrene with maleic anhydride or semi-esters thereof, and copolymers using, as a comonomer, at least one monomer selected from copolymerizable monomers, such as acrylic acid, acrylic esters, methacrylic acid, methacrylic esters, acrylamide, acrylonitrile, ethylene, propylene, vinyl chloride, and vinyl acetate, and mixtures of the above polymers. Preferred are polyisoprene, polybutadiene, polychloroprene, polyvinyl alcohol or partial acetalization products of polyvinyl alcohol, e.g., polyvinylacetal, polyvinyl butyral, polyvinyl acetate, ethylene/vinyl acetate copolymer, and vinyl chloride/vinyl acetate copolymer, polymethylmethacrylate, or mixtures of the above polymers.

The recorded hologram may be stabilized through monomer transfer by heating. To this end, the matrix polymer preferably has a relatively low glass transition temperature and can facilitate the monomer transfer.

The amount of the photopolymerizable compound used is generally 10 to 1,000 parts by weight, preferably 10 to 100 parts by weight, based on 100 parts by weight of the matrix polymer.

The amount of the photopolymerization initiator used is generally 1 to 10 parts by weight, preferably 5 to 10 parts by weight, based on 100 parts by weight of the matrix polymer. The amount of the sensitizing dye used is generally 0.01 to 1 part by weight, preferably 0.01 to 0.5 part by weight, based on 100 parts by weight of the matrix polymer.

Other photosensitive material components include various nonionic surfactants, cationic surfactants, and anionic surfactants.

The hologram-recording material is added to acetone, methyl ethyl ketone, methyl isobutyl ketone, cyclohexanone, benzene, toluene, xylene, chlorobenzene, tetrahydrofuran, methyl cellosolve, ethyl cellosolve, methyl cellosolve acetate, ethyl cellosolve acetate, ethyl acetate, 1,4-dioxane, 1,2-dichloroethane, dichloromethane, chloroform, methanol, ethanol, isopropanol, or a mixed solvent composed of the above solvents to prepare a coating liquid having a solid content of 15 to 25% by weight. The thickness of the hologram-recording layer is generally 0.1 to 50 μm, preferably 1 to 20 μm.

In order to realize easy and good transfer of the hologram-forming layer 4 formed of the hologram-forming material, the hologram-forming material (hologram-forming layer) after curing should have a breaking strain of 0.5 to 15% at 25° C. and a breaking strain of 0.5 to 30% at 120° C. When the breaking strain is outside the above range, the transferability is unsatisfactory, making it difficult to transfer the hologram. The breaking strain is preferably 1 to 10% at 25° C. and 1 to 15% at 120° C.

According to the present invention, when the hologram is a volume hologram, the hologram layer particularly preferably has a glass transition temperature of 100° C. or above.

Therefore, in order to bring the breaking strains to the above respective ranges, a hologram-forming material should be selected, and, for the selected hologram-forming material, proper curing conditions and the like should be previously determined by a preliminary test.

According to the present invention, the breaking strain at 25° C. of the cured hologram-forming layer was measured with a self-recording tester (Tensilon universal tester, manufactured by ORIENTEC) at a tensile speed of 2 mm/min, and the breaking strain at 120° C. of the cured hologram-forming layer was measured with a solid viscoelastic analyzer RSA-II (manufactured by rheometrics) at a tensile speed of $3.5 \times 10^{-4}$/sec.

Examples of materials usable for the heat-sensitive adhesive layer 5 include ethylene/vinyl acetate copolymer resins, polyamide resins, polyester resins, polyethylene resins, ethylene/isobutyl acrylate copolymer resins, butyral resins, polyvinyl acetate and vinyl acetate copolymer resins, cellulose resins, polymethyl methacrylate resins, polyvinyl ether resins, polyurethane resins, polycarbonate resins, polypropylene resins, epoxy resins, and phenolic resins, and thermoplastic resins, such as SBS, SIS, SEBS, and SEPS.

The release layer 6 may be formed of, for example, one member or a mixture of two or members selected from polymethacrylic ester resins, polyvinyl chloride resins, cellulose resins, silicone resins, chlorinated rubbers, casein, various surfactants, metal oxides and the like. In particular, the release layer is preferably formed using materials and the like which have been properly selected so that the peel force between the substrate film and the transfer layer is 1 to 5 gf/inch. (90-degree peel test). The release layer may be formed by providing an ink for the release layer and applying the ink onto the surface of a substrate film by a conventional method such as coating. The thickness of the release layer is preferably in the range of 0.1 to 2 μm from the viewpoints of peel force, transferability and the like.

Regarding the reflective layer 7, when the reflective layer is formed of a metallic thin layer which reflects light, the hologram is of an opaque type, while when the reflective layer is formed of a material which is transparent and has a refractive index different from the hologram layer, the hologram is of a transparent type. Both of these types may be used in the present invention. The reflective layer may be formed by any conventional method, such as sublimation, vacuum deposition, sputtering, reactive sputtering, ion plating, or electroplating.

Metallic thin layers for opaque holograms include, for example, thin layers formed by using, either alone or in combination with two or more, metals, such as chromium, titanium, iron, cobalt, nickel, copper, silver, gold, germanium, aluminum, magnesium, antimony, lead, palladium, cadmium, bismuth, tin, selenium, indium, gallium, and rubidium, and oxides, nitrides and the like of these metals. Among the above metallic thin layers, thin layers of aluminum, chromium, nickel, silver, gold and the like are particularly preferred. The thickness of the thin layer is generally 1 to 10,000 nm, preferably 20 to 200 nm.

The thin layer for transparent holograms may be made of any material so far as the material is transparent to light and can develop hologram effect. An example of this type of material is a transparent material having a refractive index different from that of the resin constituting the hologram-forming layer (photocured resin layer). In this case, the refractive index may be greater or smaller than that of the resin constituting the hologram-forming layer. The difference of the refractive index is preferably not less than 0.1, more preferably not less than 0.5, optimally not less than 1.0. A metallic reflective layer having a thickness of not more than 20 nm is an example of reflective layers other than described above. Preferred transparent reflective layers include layers of titanium oxide ($TiO_2$), zinc sulfide (ZnS), Cu—Al composite metal oxide and the like.

Figure 4:
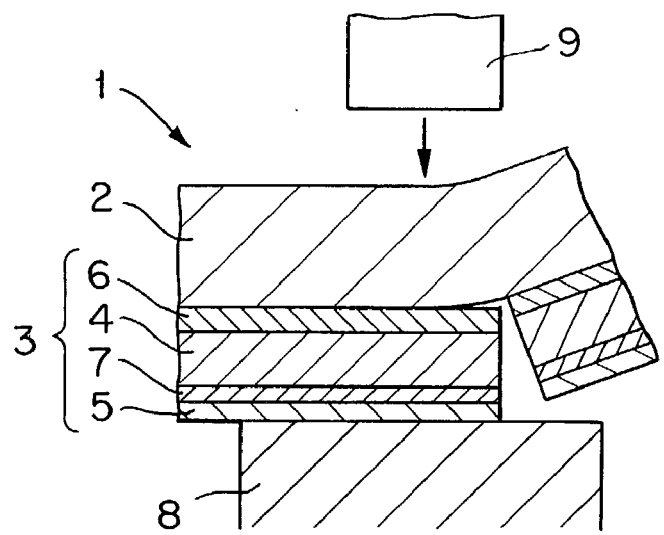
FIG. 4 is a diagram illustrating an embodiment of a transfer process using the hologram transfer film according to the present invention.

FIG. 4 is a diagram illustrating an embodiment of a transfer process using the hologram transfer film according to the present invention. When the transfer is carried out using the hologram transfer film according to the present invention, as shown in FIG. 4, the hologram transfer film 1 of the present invention is put on the surface of an object 8, onto which a hologram is to be applied, in such a manner that the heat-sensitive adhesive layer 5 in the transfer film comes into contact with the object 8. The top (on the side of the substrate film 2) of the transfer film 1 in its portion, onto which a hologram is to be applied, is heated and pressed by means of a pressing plate 9 or the like to melt and adhere the heat-sensitive adhesive layer in its desired portion. Thereafter, the transfer film is separated. Thus, the transfer layer in its desired portion only can be transferred to provide a hologram on the surface of the object.

In the present invention, a barrier layer (not shown) can be provided between the release layer and the hologram-forming layer. The barrier layer is effective to prevent migration of low molecular weight components from the hologram-forming layer to the release layer. Such migration may cause shift of a peak wavelength of the recorded hologram to blue side. Further, such migration of low molecular weight components causes deterioration of the release layer. The barrier layer preferably comprises an ionizing radiation-curable resin. EB resins exemplified as suitable resins for a relief hologram can also be employed as resins for the barrier layer.

Next, preferred embodiments of the process for producing a hologram transfer film according to the present invention will be described.

Specifically, the production process of a hologram transfer film according to a preferred embodiment of the present invention comprises the steps of: providing a film having a hologram-forming layer and a film having a heat-sensitive adhesive layer in respective independent steps; and then laminating these films in combination according to applications of the hologram.

More specifically, the production process comprises the steps of: providing a first film having a hologram-forming layer, a second film having a heat-sensitive adhesive layer, and a third film having a release layer in respective independent steps; forming a hologram image in the hologram-forming layer in the first film; and then laminating the second film and the third film onto the first film. In this case, the lamination of the first to third films may be carried out by the dry process. This is advantageous from the viewpoint of process because there is no need to use any solvent.

Further, the production process of the present invention includes an embodiment wherein a film having a hologram-forming layer and a release layer and a film having a heat-sensitive adhesive layer are provided in respective independent steps and an embodiment wherein a film having a hologram-forming layer and a heat-sensitive adhesive layer and a film having a release layer are provided in respective independent steps.

The hologram-forming layer includes a volume hologram and a relief hologram.

Further, the production process of the present invention includes an embodiment which comprises the steps of: recording a volume hologram in the hologram-forming layer in the first film; laminating the third film thereon; performing development; and laminating the second film onto the developed assembly.

The first film may have a construction comprising: a support film of PET or the like; a hologram-forming layer provided on the support film; and a releasable PET provided on the hologram-forming layer (PET/hologram-forming layer/releasable PET). The second film may have a construction comprising: a releasable PET; a heat-sensitive adhesive layer provided on the releasable PET; and a releasable PET provided on the heat-sensitive adhesive layer (releasable PET/heat-sensitive adhesive layer/releasable PET). The third film may have a construction comprising a support film, such as PET, having thereon a release layer (PET/release layer).

Specific processes for producing a volume hologram type hologram transfer film using the first to third films will be described.

At the outset, a predetermined hologram image is recorded (exposed) in the hologram-forming layer in the first film. Thereafter, the releasable PET is separated and removed. The third film is then laminated thereon so that the release layer in the third film faces the hologram layer in the first film. The assembly is then introduced into a development treatment line wherein predetermined heat treatment and UV treatment are carried out to develop a recorded image. Further, the support film laminated onto the hologram layer is separated and removed to expose the hologram-forming layer. The second film is laminated thereon with heating (for example, at 100 to 180° C.) in such a manner that the heat-sensitive adhesive layer in the second film faces the hologram image, thereby providing a layer construction of releasable PET/heat-sensitive adhesive layer/hologram layer/release layer/PET film (support film). The releasable PET may be then separated therefrom to provide a transfer film.

The transfer film may be transferred onto a predetermined object by the above method. The object, onto which the hologram is to be transferred, is not particularly limited, and examples thereof include plastic cards, portable telephones, notes or gold notes, daily necessities, and CD-ROM packages.

The present invention also includes a method for controlling the interlaminar strength among the first to third films.

Preferably, in the layer construction of the transfer film, the relative relationship among the interlaminar strength A between the release layer and the support film, the interlaminar strength B between the release layer and the hologram-forming layer, the interlaminar strength C between the hologram-forming layer and the heat-sensitive adhesive layer and the B value satisfy the following requirements:

Interlaminar stregnth: $C \geq B > A$

B value: 600 gf/in.

Further, according to a preferred embodiment of the present invention, the release layer consists of an acrylic resin having a molecular weight of about 20,000 to 100,000 alone or is formed of a composition composed of the acrylic resin, a vinyl chloride/vinyl acetate copolymer resin having a molecular weight of 8,000 to 20,000 According to a particularly preferred embodiment, the release layer is formed of a composition comprising the above components and, in addition, 1 to 5% by weight of a polyester resin having a molecular weight of 1,000 to 5,000 as an additive.

The heat-sensitive adhesive layer is particularly preferably formed of a composition which comprises an ethylene/vinyl acetate copolymer resin (EVA) having a vinyl acetate content of not less than 25% and is heat sealable at 180° C. or below. Further, according to a preferred embodiment of the present invention, the heat-sensitive adhesive layer has been colored.

Second Invention

The second invention will be described with reference to the following preferred embodiments.

The photocurable resin composition according to the present invention is characterized by being used for forming a hologram or a diffraction grating on a gsubstrate having a Young's modulus at 1% elongation of not less than 2,000 MPa at 25° C. and a Young's modulus at 1% elongation of not less than 350 MPa at 120° C., the photocurable resin composition providing a cured product of which the Young's modulus at 1% elongation at 25° C. and the Young's modulus at 1% elongation at 120° C. are respectively lower than those of the substrate. The use of this photocurable resin composition can provide holograms and diffraction gratings which have excellent conformability to flexing or expansion/contraction of the substrate sheet and objects with holograms or diffraction gratings being applied thereon.

Substrates usable in the present invention include about 10 to 100 μm-thick plastic films which have hitherto been used as substrates for holograms or diffraction gratings so far as the above Young's modulus requirements are satisfied. Representative examples thereof include polyethylene terephthalate (PET) films.

In the photocurable resin composition according to the present invention, the photocurable resin as a main component may be any photocurable resin so far as a photocurable resin composition using the photocurable resin satisfies the above requirements.

Holograms may be classified into relief holograms and volume holograms. Photocurable resins usable in the formation of relief holograms and diffraction gratings include various resin materials, such as thermosetting resins, thermoplastic resins, and ionizing radiation-curable resins.

Thermosetting resins include, for example, unsaturated polyester resins, acryl-modified urethane resins, epoxy-modified acrylic resins, epoxy-modified unsaturated polyester resins, alkyd resins, and phenolic resins. Thermoplastic resins include, for example, acrylic ester resins, acrylamide resins, nitrocellulose resins, and polystyrene resins. These resins may be homopolymers or copolymers of two or more components. Further, these resins may be used alone or in combination of two or more. Any suitable material may be selected from the following materials and compounded in these resins: various isocyanate compounds; metallic soaps, such as cobalt naphthenate and zinc naphthenate; organic peroxides, such as benzoyl peroxide and methyl ethyl ketone peroxide; and heat or ultraviolet curing agents, such as benzophenone, acetophenone, anthraquinone, naphthoquinone, azobisisobutyronitrile, and diphenyl sulfide.

Ionizing radiation-curable resins include, for example, epoxy-modified acrylate resins, urethane-modified acrylate resins, and acryl-modified polyesters. Among them, urethane-modified acrylate resins are particularly preferred. Urethane-modified acrylic resins represented by the following formula are particularly preferred:

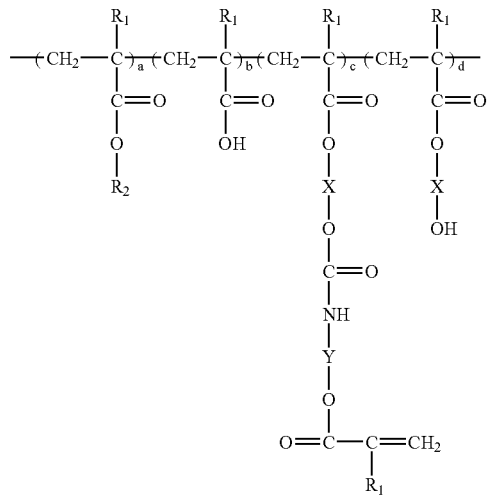

wherein five $R_1$'s each independently represent a hydrogen atom or a methyl group; $R_2$ represents a $C_1$–$C_{16}$ hydrocarbon group; X and Y each represent a straight-chain or branched alkylene group; and, with the sum of a, b, c, and d being 100, a is an integer of 20 to 90, b is an integer of 0 to 50, c is an integer of 10 to 80, and d is an integer of 0 to 20.

A preferred example of the urethane-modified acrylic resins is an acrylic copolymer produced by copolymerizing 20 to 90 moles of methyl methacrylate with 0 to 50 moles of methacrylic acid and 10 to 80 moles of 2-hydroxyethyl methacrylate (the total amount of these monomers being 100 moles). In this copolymer, hydroxyl groups present in the copolymers have been reacted with methacryloyloxyethyl isocyanate (2-isocyanate ethyl methacrylate).

Therefore, the copolymer is not required to be in such a state that all the hydroxyl groups present in the copolymer have been reacted with the methacryloyloxyethyl isocyanate. More specifically, the copolymer may be in such a state that at least 10% by mole, preferably not less than 50% by mole, of the hydroxyl groups in 2-hydroxyethyl methacrylate units have been reacted with the methacryloyloxyethyl isocyanate. Hydroxyl-containing monomers, such as N-methylolacrylamide, N-methylolmethacrylamide, 2-hydroxyethyl acrylate, 2-hydroxyethyl methacrylate, 2-hydroxypropyl acrylate, 2-hydroxypropyl methacrylate, 4-hydroxybutyl acrylate, and 4-hydroxybutyl methacrylate, may be used instead of or in combination with the 2-hydroxyethyl methacrylate.

Thus, for example, when the formation of diffraction gratings and the like is contemplated, the resin composition composed mainly of a urethane-modified acrylic resin with a large number of methacryloyl groups being introduced into the molecule through the utilization of hydroxyl groups present in a hydroxyl-containing acrylic resin enables ionizing radiations, such as ultraviolet light and electron beams, to be used as curing means and, in addition, can form diffraction gratings and the like possessing excellent softness, heat resistance and other properties despite high crosslink density.

In the preparation of the urethane-modified acrylic resin, the copolymer may be dissolved in a solvent capable of dissolving the copolymer, for example, toluene, ketone, cellosolve acetate, or dimethyl sulfoxide, to prepare a solution, to which methacryloyloxyethyl isocyanate is added dropwise with stirring of the solution to react isocyanate groups with hydroxyl groups in the acrylic resin to form a urethane bond, thereby introducing methacryloyl groups into the resin through the urethane bond. In this case, the amount of methacryloyloxyethyl isocyanate used is such that the ratio of the isocyanate group to the hydroxyl group in the acrylic resin is 0.1 to 5 moles, preferably 0.5 to 3 moles, of the isocyanate group per mole of the hydroxyl group. When the amount of methacryloyloxyethyl isocyanate used is one equivalent or more based on the amount of the hydroxyl group in the resin, there is a possibility that the methacryloyloxyethyl isocyanate is also reacted with carboxyl groups in the resin to create linkage of —CONH—$CH_2CH_2$—.

The above embodiment is such that, in the above formula, all $R_1$'s and $R_2$'s represent a methyl group and X and Y each represent an ethylene group. The present invention, however, is not limited to this embodiment. Specifically, five $R_1$'s each independently may represent a hydrogen atom or a methyl group. Further, specific examples of $R_2$ include methyl, ethyl, n- or iso-propyl, n-, iso-, or t-butyl, substituted or unsubstituted phenyl, and substituted or unsubstituted benzyl groups. Specific examples of X and Y include ethylene, propylene, diethylene, and dipropylene groups. The average molecular weight of the whole urethane-modified acrylic resin, thus obtained, to be used in the present invention is preferably 10,000 to 200,000, more preferably 20,000 to 40,000, as measured by gel permeation chromatography (GPC) using polystyrene as a standard.

A photocurable resin composition comprising the above urethane-modified acrylic resin as a main component of the film-forming component, which, together with a release agent, has been dissolved in a suitable organic solvent, is used for the production of the relief holograms and diffraction gratings according to the present invention. The organic solvent used may be any organic solvent which can dissolve the urethane-modified acrylic resin. When coatability and drying properties are taken into consideration, however, organic solvents usable herein include: aromatic solvents, such as toluene and xylene; ketone solvents, such as acetone, methyl ethyl ketone (MEK), methyl isobutyl ketone, and cyclohexanone; and cellosolve organic solvents, such as methylcellosolve and ethylcellosolve. In particular, a mixed solvent composed of these solvents is preferred. The solid concentration of the urethane-modified acrylic resin in the composition is not particularly limited. In general, however, the solid concentration is preferably about 1 to 50% by weight.

The photocurable resin composition according to the present invention contains, in addition to the urethane-modified acrylic resin, a release agent. Release agents usable herein include conventional release agents, for example, solid waxes, such as polyethylene wax, amide wax, and Teflon powder, surfactants, such as fluorine and phosphoric ester surfactants, and silicones. Particularly preferred release agents are modified silicones, and specific examples thereof include:

1) silicone oils of side chain modification type;
2) silicone oils of both ends modification type;
3) silicone oils of one end modification type;
4) silicone oils of side chain and both ends modification type;
5) methylpolysiloxanes containing trimethylsiloxy-silicic acid (called "silicone resin");
6) silicone-grafted acrylic resins; and
7) methylphenylsilicone oils.

Modified silicone oils are classified into reactive silicone oils and nonreactive silicone oils. Reactive silicone oils include amino-modified, epoxy-modified, carboxyl-modified, carbinol-modified, methacryl-modified, mercapto-modified, phenol-modified, and one-end reactive, and dissimilar functional group-modified silicone oils. Nonreactive silicone oils include polyether-modified, methylstyryl-modified, alkyl-modified, higher fatty acid ester-modified, hydrophilic group-modified, higher alkoxy-modified, higher fatty acid-modified, and fluorine-modified silicone oils.

Among the above silicone oils, reactive silicone oils of the type having a group reactive with the film-forming component are reacted with the resin in the course of curing of the resin layer, and bonded to the resin, and, therefore, can impart unique properties without bleeding on the surface of the resin layer on which a concave-convex pattern formed thereon is formed later. They are particularly effective in improving the adhesion to a deposit layer formed in the step of vapor deposition.

According to the present invention, the photocurable resin composition. (coating composition) of the present invention may be processed as follows. For example, the resin composition is coated onto a substrate, for example, a polyester film, to form a photocurable resin layer, various concave-convex patterns are imparted to the photocurable resin layer, the resin layer is then exposed to ultraviolet light or an electron beam to cure the resin layer, and a metal deposit or a layer having a different refractive index is laminated onto the surface of the formed concave-convex pattern to prepare a relief hologram or a diffraction grating.

Therefore, when the step of coating the composition onto the film (coating and drying) and the step of duplicating a hologram or the like are carried out separately from each other, the presence of tack on the surface of a layer formed by coating unfavorably causes blocking at the time of direct winding of the film having this layer thereon into a roll. Use of a solvent system, which is localized on the surface side of the coating, at the time of coating and drying is effective in preventing the blocking. This is also effective in enhancing repetitive embossing properties at the time of duplication. Further, when the surface of the layer formed by coating is tacky, a method may be adopted wherein a release film is laminated onto the layer surface followed by winding of the film. When the step of coating the composition onto the film (coating and drying) and the step of duplicating a hologram or the like are carried out in a continuous process, the above constraints are relaxed.

According to the present invention, incorporation of the release agent (particularly silicone) into the photocurable resin composition, for example, when diffraction gratings and the like are prepared by embossing, improves the separation between the press stamper of the diffraction grating and the photocured resin layer, prevents the contamination of the press stamper, and enables the press stamper to be continuously used for a long period of time (this capability being referred to as "repetitive embossing properties"). The amount of the release agent used is generally about 0.1 to 50 parts by weight, preferably about 0.5 to 10 parts by weight, based on 100 parts by weight of the urethane-modified acrylic resin. When the amount of the release agent used is less than the lower limit of the above amount range, the separation between the press stamper and the photocured resin layer is unsatisfactory, making it difficult to prevent the contamination of the press stamper. On the other hand, when the amount of the release agent used exceeds the upper limit of the above amount range, surface roughening of a coating by cissing disadvantageously occurs at the time of coating of the composition. Further, in this case, in the product, problems unfavorably occur including a deterioration in the adhesion of the resin composition layer to the substrate per se and the adhesion of the resin composition layer to an adjacent layer, for example, a deposit layer, or the occurrence of breaking of the film at the time of transfer (due to very weak film strength).

Further, in order to regulate the softness or crosslink density of the photocured resin layer obtained after curing to bring the Young's modulus to the above values, the photocurable resin composition of the present invention preferably contains a urethane acrylate. Urethane acrylates include, for example, a product of a reaction of an isocyanate-containing compound, such as 2,4-tolylene diisocyanate, with a (meth)acrylate having an organic group, such as 2-hydroxyethyl methacrylate, reactive with the isocyanate group, a compound, as described in Japanese Patent Laid-Open No. 19842/1991, prepared by reacting a diisocyanate with a diol having a hydroxyl group in its both ends to prepare a product having an isocyanate group in its both ends and reacting this product with the hydroxyl-containing (meth)acrylate, and those as described in Japanese Patent Laid-Open No. 37193/1976. The urethane acrylate is used in an amount of 0 to 50 parts by weight, preferably 5 to 30 parts by weight, based on 100 parts by weight of the urethane-modified acrylic resin.

Further, in order to regulate the softness or crosslink density of the photocured resin layer obtained after curing to bring the Young's modulus of the layer to the above modulus ranges, the photocurable resin composition of the present invention may contain a conventional thermoplastic resin or acrylic or other monofunctional or polyfunctional monomer, oligomer and the like.

Examples of monofunctional compounds usable herein include mono(meth)acrylates, such as tetrahydrofurfuryl (meth)acrylate, hydroxyethyl (meth)acrylate, vinylpyrrolidone, (meth)acryloyloxyethyl succinate, (meth)acryloyloxyethyl phthalate, and examples of bifunctional or higher functional compounds usable herein include, when classified according to skeleton structure, polyol (meth)acrylates (such as epoxy-modified polyol (meth)acrylate and lactone-modified polyol (meth)acrylate), polyester (meth)acrylate, epoxy (meth)acrylate, urethane (meth)acrylate, and other poly (meth)acrylates having polybutadiene, isocyanuric acid, hydantoin, melamine, phosphoric acid, imide, phosphazene and other skeletons. That is, various ultraviolet- or electron beam-curable monomers, oligomers, and polymers are usable.

More specifically, examples of bifunctional monomers and oligomers include polyethylene glycol di(meth)acrylate, polypropylene glycol di(meth)acrylate, neopentyl glycol di(meth)acrylate, and 1,6-hexanediol di(meth)acrylate; examples of trifunctional monomers, oligomers, and polymers include trimethylolpropane tri(meth)acrylate, pentaerythritol tri(meth)acrylate, and aliphatic tri(meth)acrylate; examples of tetrafunctional monomers and oligomers include pentaerythritol tetra(meth)acrylate, ditrimethylolpropane tetra(meth)acrylate, and aliphatic tetra(meth)acrylate; and examples of pentafunctional or higher monomers and oligomers include dipentaerythritol penta(meth)acrylate, dipentaerythritol hexa(meth)acrylate and, in addition, (meth)acrylates having a polyester skeleton, a urethane skeleton, and phosphazene skeleton. The number of functional groups is not particularly limited. However, when the number of functional groups is less than 3, the heat resistance is likely to lower. On the other hand, when the number of functional groups is 20 or more, the softness is likely to lower. For this reason, in particular, the number of functional groups is preferably 3 to 20.

The amount of the monomer or oligomer used is generally about 5 to 40 parts by weight, preferably about 10 to 30 parts by weight, based on 100 parts by weight of the urethane-modified acrylic resin. When the amount of the monomer or oligomer used is less than the lower limit of the above amount range, the strength, heat resistance, scratch resistance, water resistance, and chemical resistance of the cured resin layer and the adhesion of the cured resin layer to the substrate are unsatisfactory. On the other hand, when the amount of the monomer or oligomer used exceeds the upper limit of the above amount range, the tackiness of the surface is high. This unfavorably poses problems including that blocking is likely to occur and, at the time of duplication of holograms or the like, a part of the material is left on the plate (press stamper), resulting in lowered repetitive embossing properties.

According to the present invention, when the photocurable resin composition is cured by ultraviolet light, the addition of a photosensitizer to the photocurable composition is necessary. On the other hand, in the case of curing by electron beams, the addition of the photosensitizer is not required. Photosensitizer usable herein include various photosensitizers used in conventional ultraviolet-curable coating compositions, for example, benzoin compounds, such as benzoin, benzoin methyl ether, benzoin ethyl ether, benzoin isopropyl ether, α-methylbenzoin, and α-phenylbenzoin; anthraquinone compounds, such as anthraquinone and methylanthraquinone; benzyl; diacetyl; phenyl ketone compounds, such as acetophenone and benzophenone; sulfide compounds, such as diphenyl disulfide and tetramethylthiuram sulfide; α-chloromethylnaphthalene; anthracene; and halogenated hydrocarbons, such as hexachlorobutadiene and pentachlorobutadiene. The amount of the photosensitizer used is preferably about 0.5 to 10 parts by weight based on 100 parts by weight of the urethane-modified acrylic resin.

According to a preferred embodiment of the present invention, the photocurable resin composition is characterized by being used for forming a hologram or a diffraction grating on a substrate having a Young's modulus at 1% elongation of 4,000 to 2,000 MPa at 25° C. and a Young's modulus at 1% elongation of 1,000 to 350 MPa at 120° C., the photocurable resin composition providing a cured product of which the Young's modulus at 1% elongation at 25° C. and the Young's modulus at 1% elongation at 120° C. are 3,000 to 1,000 MPa and 500 to 100 MPa, respectively.

For the substrate, when the Young's modulus at 1% elongation at 25° C. and the Young's modulus at 1% elongation at 120° C. are less than 2,000 MPa and less than 350 MPa, respectively, that is, when the Young's modulus at 25° C. and the Young's modulus at 120° C. of the substrate are lower than the respective lower limits of the above Young's modulus ranges, disadvantageously, the width of the substrate cannot be held in the step of fabrication.

Incorporation of a polymerization inhibitor into the photocurable resin composition of the present invention comprising the above components can improve the storage stability of the resin composition. Polymerization inhibitors usable herein include: phenols, such as hydroquinone, t-butylhydroquinone, catechol, and hydroquinone monomethyl ether; quinones, such as benzoquinone and diphenylbenzoquinone; phenothiazine; and copper compounds. Further, if necessary, accelerators, viscosity modifiers, surfactants, antifoaming agents, silane coupling agents and other various assistants may be added to the resin composition. The addition of polymeric materials, such as styrene-butadiene rubber, is also possible.

Next, the production process of relief hologram and diffraction grating sheets using the above photocurable resin composition will be described.

The photocurable resin composition is coated on or impregnated into a substrate, such as a metal plate, paper, or polyethylene terephthalate. The coated substrate is then dried at a temperature high enough to vaporize the organic solvent contained in the composition, for example, is guided to and dried in a heating furnace of 100 to 165° C. for about 0.1 to one min, to form a photocurable resin layer on the substrate.

The photocurable resin layer is then subjected to patterning (embossing) of a desired hologram relief, for example, by means of a press stamper, followed by application of ultraviolet light, an electron beam or the like to photocure the resin layer.

The hologram thus obtained is generally of transmission type. Therefore, a reflective layer should be provided. The use of a metallic thin layer, which reflects light, as the reflective layer provides an opaque hologram. On the other hand, the use of a layer of a material, which is transparent and has a refractive index different from that of the hologram layer, as the reflective layer provides a transparent hologram. Both of these types may be used in the present invention. The reflective layer may be formed by any conventional method, such as sublimation, vacuum deposition, sputtering, reactive sputtering, ion plating, or electroplating.

Metallic thin layers for opaque holograms include, for example, thin layers formed by using, either alone or in combination with two or more, metals, such as chromium, titanium, iron, cobalt, nickel, copper, silver, gold, germanium, aluminum, magnesium, antimony, lead, palladium, cadmium, bismuth, tin, selenium, indium, gallium, and rubidium, and oxides, nitrides and the like of these metals. Among the above metallic thin layers, thin layers of aluminum, chromium, nickel, silver, gold and the like are particularly preferred. The thickness of the thin layer is generally 1 to 10,000 nm, preferably 20 to 200 nm.

The thin layer for transparent holograms may be made of any material so far as the material is transparent to light and can develop hologram effect. An example of this type of material is a transparent material having a refractive index different from that of the resin constituting the hologram-forming layer (photocured resin layer). In this case, the refractive index may be higher or lower than that of the resin constituting the hologram-forming layer. The difference of the refractive index, however, is preferably not less than 0.1, more preferably not less than 0.5, most preferably not less than 1.0. A metallic reflective layer having a thickness of not more than 20 nm is an example of reflective layers other than described above. Preferred transparent reflective layers include layers of titanium oxide ($TiO_2$), zinc sulfide (ZnS), Cu—Al composite metal oxide and the like.

More specifically, the embossing of the hologram pattern is carried out, for example, by a conventional method using a pair of emboss rolls consisting of a metallic roll, with a press stamper being mounted on the periphery thereof, and a paper roll, for example, at a temperature of 50 to 150° C. and a pressure of 10 to 50 kg/cm$^2$. Embossing on one side suffices for contemplated results. However, embossing on both sides is also possible.

In embossing, the temperature setting of the emboss roll is important. Embossing at a relatively high temperature and a relatively high pressure is preferred from the viewpoint of faithful reproduction of the shape of embosses. On the other hand, embossing at a relatively low temperature and a relatively low pressure is preferred from the viewpoint of preventing the deposition of the resin onto the emboss plate. Further, in consideration of effective heat capacity, the carrying speed of the film for duplication is also important. Further, the selection of the release agent is also important in order to reduce the deposition of the resin composition onto the emboss roll.

Next, an embodiment will be described wherein the hologram is a volume hologram.

When the hologram-forming layer is a volume hologram-forming layer, the volume hologram may be formed by coating a volume hologram-forming material on a support film and recording interference fringes, corresponding to a wave front of light from an object, in the form of transmittance modulation or refractive index modulation within the hologram-forming layer. Further, duplication can be easily carried out by intimately contacting an original plate for a volume hologram with the hologram-forming layer and then conducting exposure and development.

Volume hologram layer-forming materials usable herein include all conventional volume hologram-recording materials, such as silver salt materials, bichromated gelatin emulsions, photopolymerizable resins, and photocrosslinkable resins. A photosensitive material, for dry volume phase hologram recording applications, comprising a matrix polymer, a photopolymerizable compound, a photopolymerization initiator, and a sensitizing dye is particularly preferred.

Photopolymerizable compounds include photopolymerizable, photocrosslinkable monomers, oligomers, and prepolymers having at least one ethylenically unsaturated bond per molecule which will be described later, and mixtures of the above compounds, for example, unsaturated carboxylic acids and salts thereof, esters of unsaturated carboxylic acids with aliphatic polyhydric alcohol compounds, and compounds in which unsaturated carboxylic acids are linked to aliphatic polyamine compounds by an amide linkage.

Specific examples of monomers of unsaturated carboxylic acids include acrylic acid, methacrylic acid, itaconic acid, crotonic acid, isocrotonic acid, maleic acid, and halogen-substituted unsaturated carboxylic acids, for example, chlorinated unsaturated carboxylic acids, brominated unsaturated carboxylic acids, and fluorinated unsaturated carboxylic acids. Salts of unsaturated carboxylic acids include sodium and potassium salts of the above acids.

Regarding specific examples of monomers of esters of aliphatic polyhydric alcohol compounds with unsaturated carboxylic acids, acrylic esters include ethylene glycol diacrylate, triethylene glycol diacrylate, 1,3-butanediol diacrylate, tetramethylene glycol diacrylate, propylene glycol diacrylate, neopentyl glycol diacrylate, trimethylolpropane triacrylate, trimethylolpropane tri(acryloyloxypropyl) ether, trimethylolethane triacrylate, hexanediol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol hexaacrylate, sorbitol triacrylate, sorbitol tetraacrylate, sorbitol pentaacrylate, sorbitol hexaacrylate, tri(acryloyloxyethyl) isocyanurate, polyester acrylate oligomer, 2-phenoxyethyl acrylate, 2-phenoxyethyl methacrylate, phenol ethoxylate monoacrylate, 2-(p-chlorophenoxy)ethyl acrylate, p-chlorophenyl acrylate, phenyl acrylate, 2-phenylethyl acrylate, (2-acryloxyethyl) ether of bisphenol A, ethoxylated bisphenol A diacrylate, 2-(1-naphthyloxy)ethyl acrylate, o-biphenyl methacrylate, and o-biphenyl acrylate.

Methacrylic esters include tetramethylene glycol dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis-[p-(3-methacryloxy-2-hydroxypropoxy)phenyl] dimethylmethane, bis-[p-(acryloxyethoxy)phenyl] dimethylmethane, 2,2-bis(4-methacryloyloxyphenyl) propane, and 2-naphthyl methacrylate.

Itaconic esters include ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate.

Crotonic esters include ethylene glycol dicrotonate, tetramethylene glycol dicrotonate, pentaerythritol dicrotonate, and sorbitol tetracrotonate.

Isocrotonic esters include ethylene glycol diisocrotonate, pentaerythritol diisocrotonate, and sorbitol tetraisocrotonate.

Maleic esters include ethylene glycol dimaleate, triethylene glycol dimaleate, pentaerythritol dimaleate, and sorbitol tetramaleate.

Halogenated unsaturated carboxylic acids usable herein include 2,2,3,3-tetrafluoropropyl acrylate, 1H,1H,2H,2H-heptadecafluorodecyl acrylate, 2,2,3,3-tetrafluoropropyl methacrylate, 1H,1H,2H,2H-heptadecafluorodecyl methacrylate, 2,4,6-tribromophenyl methacrylate, dibromoneopentyl dimethacrylate (NK Ester DBN, manufactured by Shin-Nakamura Chemical Co., Ltd.), dibromopropyl acrylate (NK Ester A-DBP, manufactured by Shin-Nakamura Chemical Co., Ltd.), dibromopropyl methacrylate (NK Ester DBP, manufactured by Shin-Nakamura Chemical Co., Ltd.), methacrylic acid chloride, 2,4,6-trichlorophenyl methacrylate, p-chlorostyrene, methyl 2-chloroacrylate, ethyl 2-chloroacrylate, n-butyl-2-chloroacrylate, tribromophenol acrylate, and tetrabromophenol acrylate.

Specific examples of monomers of compounds, in which unsaturated carboxylic acids are linked to aliphatic polyamine compounds by an amide linkage, include methylenebisacrylamide, methylenebismethacryl-amide, 1,6-hexamethylenebisacrylamide, 1,6-hexamethylenebismethacrylamide, diethylenetriamine trisacrylamide, xylylenebisacrylamide, xylylenebismethacrylamide, N-phenylmethacrylamide, and diacetoneacrylamide.

Other examples include polyisocyanate compounds having two or more isocyanate groups per molecule described in Japanese Patent Publication No. 41708/1973 and vinyl urethane compounds having two or more polymerizable vinyl groups per molecule with a hydroxyl-containing vinyl monomer represented by formula (1) being added thereto.

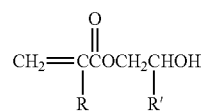

(I)

wherein R and R' each independently represent a hydrogen or a methyl group.

Urethane acrylates described in Japanese Patent Laid-Open No. 37193/1976 and polyester acrylates and polyfunctional acrylates and methacrylates, prepared from epoxy resin and (meth)acrylic acid or the like, described in Japanese Patent Laid-Open No. 64183/1973 and Japanese Patent Publication Nos. 43191/1974 and 30490/1977 may also be used.

Further, compounds introduced as photocurable monomers and oligomers in Journal of the Adhesion Society of Japan, Vol. 20, No. 7, 300–308 (1984) may also be used.

Regarding other examples, phosphorus-containing monomers include: mono(2-acryloyloxyethyl) acid phosphate (Light Ester PA, manufactured by Kyoeisha Chemical Co., Ltd.) and mono(2-methacryloyloxyethyl) acid phosphate (Light Ester PM, manufactured by Kyoeisha Chemical Co., Ltd.); and epoxy acrylate monomers (Ripoxy VR-60, manufactured by Showa High Polymer Co., Ltd.; and Ripoxy VR-90, manufactured by Showa High Polymer Co., Ltd.).

Further, NK Ester M-230G manufactured by Shin-Nakamura Chemical Co., Ltd. and NK Ester 23G manufactured by Shin-Nakamura Chemical Co., Ltd. are usable.

Further examples of monomers include: triacrylates represented by formulae (2) and (3):

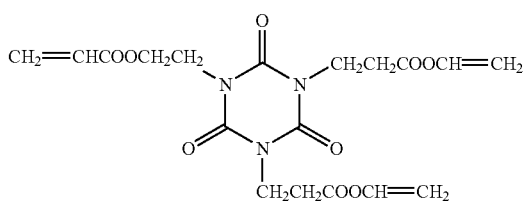

(2)

(Aronix M-315, manufactured by Toa Gosei Chemical Industry Co., Ltd.)

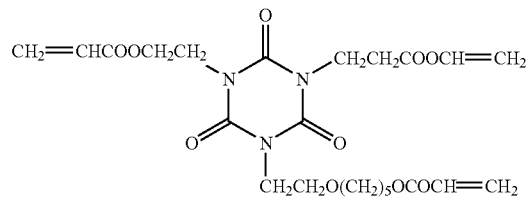

(3)

(Aronix M-325, manufactured by Toa Gosei Chemical Industry Co., Ltd.); 2,2'-bis(4-acryloxy-diethoxyphenyl)propane (NK Ester A-BPE-4, manufactured by Shin-Nakamura Chemical Co., Ltd.); and tetramethylolmethane tetraacrylate (NK ester A-TMMT manufactured by Shin-Nakamura Chemical Co., Ltd.).

Examples of plasticizers, which may be optionally added, include: polyhydric alcohols, such as ethylene glycol, diethylene glycol, triethylene glycol, glycerin, and trimethylolpropane; phthalic ester plasticizers, such as dimethyl phthalate (DMP), diethyl phthalate (DEP), dibutyl phthalate (DBP), heptylnonyl phthalate (HNP), di-2-ethylhexyl phthalate (DOP), di-n-octyl phthalate (DNOP), di-1-octyl phthalate (DCapP), (79 alkyl) phthalate (D79P), di-1-decyl phthalate (DIDP), ditridecyl phthalate (DTDP), dicyclohexyl phthalate (DCHP), butylbenzyl phthalate (BDP), ethylphthalylethyl glycolate (EPEG), and butylphthalylbutyl glycolate (BPBG); aliphatic dibasic acid ester plasticizers, such as di-2-ethylhexyl adipate (DOA), di-(methylcyclohexyl) adipate, diisodecyl adipate (DIDA), di-n-hexyl azelate (DNHZ), di-2-ethylhexyl azelate (DOZ), dibutyl sebacate (DBS), and di-2-ethylhexyl sebacate (DOS); citric ester plasticizers, such as triethyl citrate (TEC), tributyl citrate (TBC), triethyl acetylcitrate (ATEC), and tributyl acetylcitrate (ATBC); epoxy plasticizers, such as epoxidized soybean oil; and phosphoric ester plasticizers, such as tributyl phosphate (TBP), triphenyl phosphate (TPP), tricresyl phosphate (TCP), and tripropylene glycol phosphate.

Regarding initiator systems, photopolymerization initiators include, for example, 1,3-di(t-butyldioxycarbonyl)benzophenone, 3,3',4,4'-tetrakis(t-butyldioxycarbonyl)benzophenone, N-phenylglycine, 2,4,6-tris(trichloromethyl)-s-triazine, 3-phenyl-5-isoxazolone, 2-mercaptobenzimidazole, and dimers of imidazole. Preferably, the photopolymerization initiator is decomposed after recording of the hologram from the viewpoint of stabilizing the recorded hologram. An organic peroxide system is preferred because it can be easily decomposed upon ultraviolet irradiation.

Examples of sensitizing dyes include dyes having absorption of light at 350 to 600 nm, such as thiopyrilium salt, merocyanine, quinoline, styrylquinoline, ketocoumarin, thioxanthene, xanthene, oxonol, cyanine, rhodamine, thiopyrilium salt, pyrilium ion, and diphenyliodonium ion dyes. Sensitizing dyes having absorption of light in a wavelength region of not more than 350 nm or not less than 600 nm may also be used.

Matrix polymers usable herein include polymethacrylic esters or partial hydrolyzates thereof, polyvinyl acetate or hydrolyzates thereof, polyvinyl alcohol or partial acetalization products thereof, triacetylcellulose, polyisoprene, polybutadiene, polychloroprene, silicone rubber, polystyrene, polyvinyl butyral, polychloroprene, polyvinyl chloride, chlorinated polyethylene, chlorinated polypropylene, poly-N-vinylcarbazole or derivatives thereof, poly-N-vinylpyrrolidone or derivatives thereof, copolymer of styrene with maleic anhydride or semi-esters thereof, and copolymers using, as a comonomer, at least one monomer selected from copolymerizable monomers, such as acrylic acid, acrylic esters, methacrylic acid, methacrylic esters, acrylamide, acrylonitrile, ethylene, propylene, vinyl chloride, and vinyl acetate, and mixtures of the above polymers. Preferred are polyisoprene, polybutadiene, polychloroprene, polyvinyl alcohol or partial acetalization products of polyvinyl alcohol, e.g., polyvinyl acetal, polyvinyl butyral, polyvinyl acetate, ethylene/vinyl acetate copolymer, and vinyl chloride/vinyl acetate copolymer, or mixtures of the above polymers.

The recorded hologram may be stabilized through monomer transfer by heating. To this end, the matrix polymer preferably has a relatively low glass transition temperature and can facilitate the monomer transfer.

The amount of the photopolymerizable compound used is generally 10 to 1,000 parts by weight, preferably 10 to 100 parts by weight, based on 100 parts by weight of the matrix polymer.

The amount of the photopolymerization initiator used is generally 1 to 10 parts by weight, preferably 5 to 10 parts by weight, based on 100 parts by weight of the matrix polymer. The amount of the sensitizing dye used is generally 0.01 to 1 part by weight, preferably 0.01 to 0.5 part by weight, based on 100 parts by weight of the matrix polymer.

Other photosensitive material components include various nonionic surfactants, cationic surfactants, and anionic surfactants.

The hologram-recording material is added to acetone, methyl ethyl ketone, methyl isobutyl ketone, cyclohexanone, benzene, toluene, xylene, chlorobenzene, tetrahydrofuran, methyl cellosolve, ethyl cellosolve, methyl cellosolve acetate, ethyl cellosolve acetate, ethyl acetate, 1,4-dioxane, 1,2-dichloroethane, dichloromethane, chloroform, methanol, ethanol, isopropanol, or a mixed solvent composed of the above solvents to prepare a coating liquid having a solid content of 15 to 25% by weight. The thickness of the hologram-recording layer is generally 0.1 to 50 μm, preferably 1 to 20 μm.

Examples of lights usable for curing the photocurable resin composition according to the present invention include high-energy ionizing radiations and ultraviolet light. Sources of high-energy ionizing radiations include accelerators, for example, a Cockcroft accelerator, a van de Graaff accelerator, a linear accelerator, betatron, and cyclotron. Electron beams accelerated by these accelerators are industrially most convenient and cost effective. In addition, radiations emitted from radioisotopes, nuclear reactor and the like, such as γ-ray, X-ray, α-ray, neutron, and proton may also be used. Ultraviolet light sources include, for example, ultraviolet fluorescent lamps, low-pressure mercury lamps, high-pressure mercury lamps, ultrahigh-pressure mercury lamps, xenon lamps, carbon arc lamps, and sunlamps.

Holograms and diffraction grating sheets according to the present invention thus obtained may be generally used for the enhancement of the design effect or the prevention of the forgery of credit cards, bank cards and the like, decoration of the cover of books and CDs and other purposes.

As described above, the photocurable resin composition according to the present invention is characterized by being used for forming a hologram or a diffraction grating on a substrate having a Young's modulus at 1% elongation of not less than 2,000 MPa at 25° C. and a Young's modulus at 1% elongation of not less than 350 MPa at 120° C., the photocurable resin composition providing a cured product of which the Young's modulus at 1% elongation at 25° C. and the Young's modulus at 1% elongation at 120° C. are respectively lower than those of the substrate.

According to the present invention, the use of this photocurable resin composition can provide holograms and diffraction gratings which have excellent conformability to flexing or expansion/contraction of the substrate sheet and objects with holograms or diffraction gratings being applied thereon.

Suitable applications of the hologram and diffraction grating sheets according to the present invention include forgery-preventive sheets wherein the hologram or diffraction grating has been infused therein as watermarks in the form of a lustrous thread. Since the hologram and diffraction grating sheets according to the present invention have excellent conformability to flexing or expansion/contraction of objects, it is easy to produce sheets into which the hologram or diffraction grating sheet has been infused therein as watermarks in the form of a lustrous thread. At the same time, in use of the forgery-preventive sheet, the lustrous thread is conformable to the deformation of the sheet. Therefore, there is no fear of the lustrous thread being separated from the base sheet. The infusion of the lustrous thread as watermarks into the base sheet can be made by the conventional method.

In the forgery-preventive sheet according to the present invention, the lustrous thread may be infused by any form. Examples of forms include one, as disclosed in Japanese Patent Laid-Open No. 71759/1998, wherein on one side of a base sheet are provided exposed portions with an lustrous thread being intermittently exposed and a cover portion provided between the exposed portions to intermittently cover the lustrous thread, and one, as disclosed in Registered Utility Model No. 3028886, wherein a lustrous thread is exposed on a window opening having watermarks of letters or images on the surface of the sheet. The forgery-preventive sheet according to the present invention may be used in gift certificates, railway or railroad tickets, commuter passes and the like.

EXAMPLES

The present invention will be described in more detail with reference to the following examples and comparative examples.

For the cured hologram layer according to the present invention, the breaking strain was determined by self-recording a stress-strain curve (S—S curve) by means of the following measuring equipment and determining the breaking strain from the curve.

[Specimen]

A hologram-forming material to be measured was coated onto a substrate film. After curing, the cured material was separated from the substrate film, and then cut into a film specimen having a size of 5 to 10 mm in width and 20 to 50 mm in length. The thickness of the specimen is preferably 20 to 100 μm from the viewpoint of handleability. In the formation of the film specimen, previous treatment of the substrate film in its surface for rendering the surface easily releasable permits the cured hologram-forming layer to be easily separated from the substrate film.

(1) 25° C.
Measuring equipment: Tensilon universal tester RTA-100 (manufactured by ORIENTEC)
Tensile speed: 2 mm/min
(2) 120° C.
Measuring equipment: Solid viscoelastic analyzer RSA-II (manufactured by Rheometrics)
Measuring fixture (attachment): For pulling of film
Measuring mode: Strain rate sweep
Tensile speed: $3.5 \times 10^{-4}$/sec Production Example A1

Production examples of the ionizing radiation-curable urethane-modified acrylic resin useful as a material for a relief hologram will be described.

A 2-liter four-necked flask equipped with a condenser, a dropping funnel, and a thermometer was charged with 40 g of toluene and 40 g of methyl ethyl ketone (MEK) together with an azo initiator. A reaction was allowed to proceed at a temperature of 100 to 110° C. for 8 hr while dropwise adding a mixed solution composed of 22.4 g of 2-hydroxyethyl methacrylate (HEMA), 70.0 g of methyl methacrylate (MMA), 20 g of toluene, and 20 g of MEK through the dropping funnel over a period of about 2 hr. The system was then cooled to room temperature.

A mixed solution composed of 27.8 g of 2-isocyanatoethyl methacrylate (Karenz MOI, manufactured by Showa Denko K. K.), 20 g of toluene, and 20 g of methyl ethyl ketone (MEK) was added to the reaction mixture. An addition reaction was carried out in the presence of dibutyltin laurate as a catalyst. Upon confirmation of the disappearance of an absorption peak derived from an isocyanate group at 2200 cm$^{-1}$ by IR analysis of the reaction product, the reaction was terminated.

The resin solution thus obtained had a solid content of 41.0%, a viscosity of 130 mPa·sec (30° C.), a molecular weight of 35,000 as measured by gel permeation chromatography (GPC) using polystyrene as a standard, and an average amount of C=C bond introduced per molecule of 13.8% by mole.

Example A1

(Where the Hologram-Forming Layer is a Surface Relief Hologram Layer)

The following photocurable resin composition was prepared using the resin solution prepared above, and used as a material for a surface relief hologram.

| | |
|---|---|
| Resin solution prepared in Production Example A1 (on solid basis) | 100 pts. wt. |
| Release agent (trimethylsiloxysilicic acid-containing methylpolysiloxane: KF-7312, manufactured by The Shin-Etsu Chemical Co., Ltd) | 1 pt. wt. |
| Polyfunctional monomer (SR-399, manufactured by Sartomer) | 10 pts. wt. |
| Polyester acrylate (M-6100, manufactured by Toa Gosei Chemical Industry Co., Ltd.) | 10 pts. wt. |
| Photosensitizer (Irgacure 907, manufactured by Ciba Specialty Chemicals, K.K.) | 5 pts. wt. |

A mixture of the above ingredients was diluted with MEK to adjust the solid content of the composition to 50%.

A release layer (HAKURI-NISU 45-3, manufactured by Showa Ink Ind. Co., Ltd.) was gravure coated at a speed of 20 m/min on a 25-μm polyethylene terephthalate film (PET; Lumirror T60, manufactured by Toray Industries, Inc.), and dried at 100° C. to vaporize the solvent to prepare a film having a layer construction of release layer (coverage 1 g/m$^2$ on a dry film basis)/PET.

The photocurable resin composition of the present invention was roll coated on the film having a layer construction of release layer/PET in its release layer. The coating was dried at 100° C. to vaporize the solvent to prepare a photosensitive film for duplication at a coverage of 2 g/m$^2$ on a dry film basis. The film thus obtained was not tacky at room temperature, and could be stored in a roll form.

Figure 5:
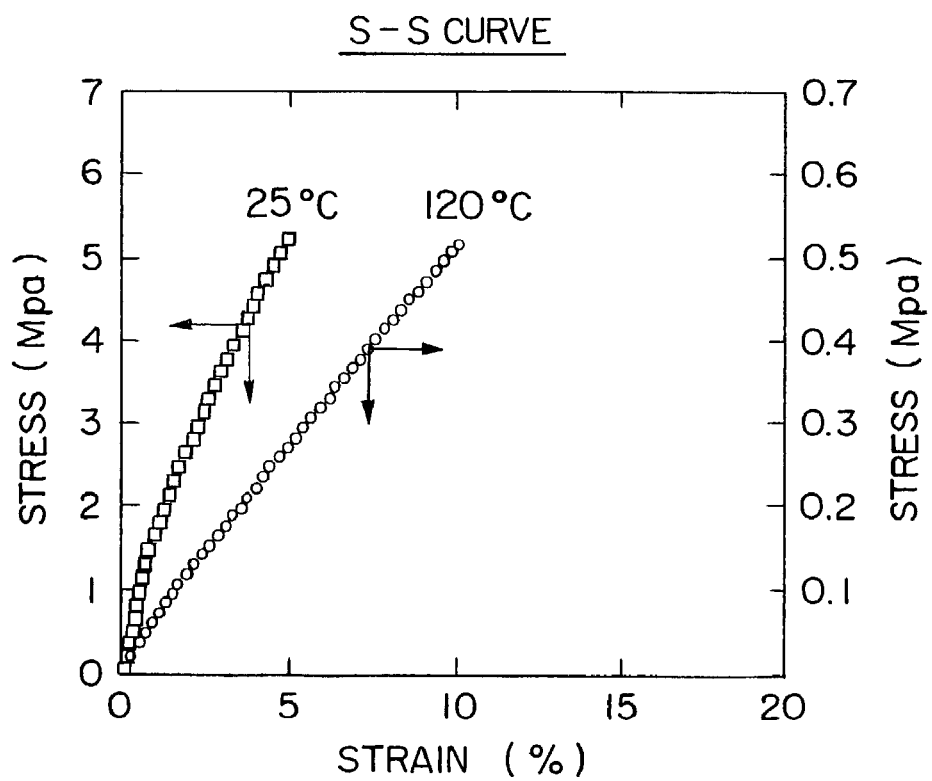
FIG. 5 is a diagram showing an S—S (stress-strain) curve for a cured hologram layer in Example A1.

Separately, a film was formed using the photocurable resin composition, and then cured. The breaking strain was measured on the cured film and found to be 5% at 25° C. and 10% at 120° C. The S—S curve is shown in FIG. 5.

A duplicator was provided which had an emboss roller equipped with a press stamper which had been prepared continuously from a master hologram prepared using a laser beam. Alternatively, a duplicated hologram may be prepared in a resin plate from a master hologram and applied onto a cylinder. The photosensitive films for duplication prepared above were set on the sheet feed side, followed by heat pressing at 150° C. to form fine concave-convex patterns. Subsequently, ultraviolet light was applied from a mercury lamp to perform photocuring. An aluminum layer was then vapor deposited thereon by vacuum deposition to prepare a reflection type relief hologram. A heat-sensitive adhesive layer [HS-ASV (manufactured by The Inctec Inc.) 10 parts/ HS-31 (manufactured by WASHIN CHEMICAL INDUSTRY CO., LTD.) 3 parts] was gravure coated on the surface thereof, and the coating was dried at 100° C. to vaporize the solvent to prepare an adhesive layer at a coverage of 1 g/m$^2$ on a dry film basis.

The transfer foil thus obtained was heated from the substrate film side at 130° C. and pressed by means of a specific mold to transfer the hologram onto a vinyl chloride card. As a result, the transferability of the hologram was good.

Example A2

(Where Hologram-Forming Layer is a Volume Hologram-Forming Layer)

A photocurable resin composition containing a polymethyl methacrylate resin having a glass transition point around 100° C. as a basic binder was used as a material for a volume hologram. The photocurable resin composition for a volume hologram was mixed with the following solvent to prepare a coating composition.

| | |
|---|---|
| Photocurable resin composition for volume hologram | 60 pts. wt. |
| Methyl ethyl ketone (MEK) | 25 pts. wt. |
| Toluene | 15 pts. wt. |

The coating composition was gravure coated at a coverage of 3 g/m$^2$ on a dry film basis onto a 50-μAm PET film (Myler 200D, manufactured by E. I. du Pont de Nemours & Co.). Further, a 50-μm PET film was laminated onto the coated surface to prepare a film for a volume hologram. Further, a cured film was prepared from the photocurable resin composition for a volume hologram separately from the following step. The breaking strain was measured on the cured film and found to be 6% at 25° C. and 13% at 120° C.

The PET film on one side of the film for a volume hologram was removed, and the film for a volume hologram was laminated onto an original plate for a volume hologram, which had been previously provided, so that the photocurable resin composition-coated surface faced the original plate. An argon laser beam having a wavelength of 514 nm was applied through the film for a hologram to obtain a volume hologram.

A release layer (HAKURI-NISU 45-3, manufactured by Showa Ink Ind. Co., Ltd.) was gravure coated at a speed of 20 m/min on a 25-μm PET film (Lumirror T60, manufactured by Toray Industries, Inc.), and dried at 100° C. to vaporize the solvent to prepare a film having a layer construction of release layer (coverage 1 g/m$^2$ on a dry film basis)/PET.

The volume hologram was separated from the original plate, and laminated on the release layer to form a layer construction of PET/release layer/volume hologram layer/PET which was then heat treated and irradiated with ultraviolet light.

PET in contact with the volume hologram layer was separated from the above construction, and a heat-sensitive adhesive (AQUATEX EC-1700, manufactured by Chuo Rika Kogyo Corporation) was gravure coated at a coverage of 2 g/m$^2$ on a dry basis onto the volume hologram layer to prepare a volume hologram transfer foil having a layer construction of PET/release layer/volume hologram layer/heat-sensitive adhesive layer. The transfer foil thus obtained was heated from the substrate film side at 130° C. and pressed by means of a specific mold to transfer the hologram onto a vinyl chloride card. As a result, the transferability of the hologram was good.

Example A3

(Where Hologram-Forming Layer is a Volume Hologram-Forming Layer)

A photocurable resin composition containing a polymethyl methacrylate resin having a glass transition point around 100° C. as a basic binder was used as a material for a volume hologram.

The photocurable resin composition for a volume hologram was mixed with the following solvent to prepare a coating composition.

| | |
|---|---|
| Photocurable resin composition for volume hologram | 60 pts. wt. |
| Methyl ethyl ketone (MEK) | 25 pts. wt. |
| Toluene | 15 pts. wt. |

The coating composition was gravure coated at a coverage of 3 g/m$^2$ on a dry film basis onto a 50-μm PET film (Mylar 200D, manufactured by E. I. du Pont de Nemours & Co.). Further, a 50-μm PET film was laminated onto the coated surface to prepare a film for a volume hologram. Further, a cured film was prepared from the photocurable resin composition for a volume hologram separately from the following step. The breaking strain was measured on the cured film and found to be 6% at 25° C. and 13% at 120° C.

The PET film on one side of the film for a volume hologram was removed, and the film for a volume hologram was laminated onto an original plate for a volume hologram, which had been previously provided, so that the photocurable resin composition-coated surface faced the original plate. An argon laser beam having a wavelength of 514 nm was applied through the film for a hologram to obtain a volume hologram.

A release layer (HAKURI-NISU 45-3, manufactured by Showa Ink Ind. Co., Ltd.) was gravure coated at a speed of 20 m/min on a 25-μm PET film (Lumirror T60, manufactured by Toray Industries, Inc.), and dried at 100° C. to vaporize the solvent to prepare a film having a layer construction of release layer (coverage 1 g/m$^2$ on a dry film basis)/PET.

The volume hologram was separated from the original plate, and laminated on the release layer to form a layer construction of PET/release layer/volume hologram layer/PET which was then heat treated and irradiated with ultraviolet light.

A heat-sensitive adhesive (AD-1790-15, manufactured by Toyo Morton Ltd.) was gravure coated at a coverage of 3 g/m$^2$ on a dry basis onto a releasable PET (SP-PET-03-50BU, manufactured by Tocello Co., Ltd.) to form a heat-sensitive adhesive layer. PET in contact with the volume hologram layer was separated from the layer construction of PET/release layer/volume hologram layer/PET, and the heat-sensitive adhesive layer was laminated at 140° C. onto the volume hologram layer to provide a layer construction of PET/release layer/volume hologram layer/heat-sensitive adhesive layer/releasable PET. The releasable PET was then removed to prepare a contemplated volume hologram transfer foil. The transfer foil thus obtained was heated from the substrate film side at 130° C. and pressed by means of a specific mold to transfer the hologram onto a vinyl chloride card. As a result, the transferability of the hologram was good.

Comparative Example A1

The formation and transfer of a surface relief hologram were carried out in the same manner as in Example A1, except that urethane acrylate (Shiko UV-3000B, manufactured by Nippon Synthetic Chemical Industry Co., Ltd.) was used instead of polyester acrylate in the material for a surface relief hologram.

The breaking strain after photocuring of a material film for a surface relief hologram formed for the measurement of the breaking strain was 35% at 25° C. and 18% at 120° C. In the step of transferring the hologram using the hologram-forming material, the transferability of the hologram was poor. Specifically, burrs occurred, and the hologram could not be accurately transferred onto an object.

Comparative Example A2

The formation and transfer of a hologram were carried out in the same manner as in Example A2, except that a vinyl acetate resin having a glass transition point around 40° C. as a basic binder was used in the material for a volume hologram. The breaking strain after photocuring of a material film for a volume hologram formed for the measurement of the breaking strain was not less than 20% at 25° C., and was immeasurable at 120° C. because the film had gone slack upon the mounting of the film onto the measuring equipment. Further, in the step of transferring the hologram using the hologram-forming material, the transferability of the hologram was poor. Specifically, burrs occurred, and the hologram could not be accurately transferred onto an object.

As is apparent from the above examples and comparative examples, according to the present invention, the hologram-forming material has good transferability, and a surface relief hologram and a volume hologram can be easily and accurately transferred onto objects.

Next, the present invention will be described in more detail with reference to the following production examples of the photocurable resin, examples, and comparative examples. In the following examples, "part" or "%" is by weight unless otherwise specified.

Production examples of the urethane-modified acrylic resin to be used in the present invention will be first described.

Production Example B1

A 2-liter four-necked flask equipped with a condenser, a dropping funnel, and a thermometer was charged with 40 g of toluene and 40 g of methyl ethyl ketone (MEK) together with an azo initiator. A reaction was allowed to proceed at a temperature of 100 to 110° C. for 8 hr while dropwise adding a mixed solution composed of 22.4 g of 2-hydroxyethyl methacrylate (HEMA), 70.0 g of methyl methacrylate (MMA), 20 g of toluene, and 20 g of MEK through the dropping funnel over a period of about 2 hr. The system was then cooled to room temperature.

A mixed solution composed of 27.8 g of 2-isocyanatoethyl methacrylate (Karenz MOI, manufactured by Showa Denko K. K.), 20 g of toluene, and 20 g of MEK was added to the reaction mixture. An addition reaction was carried out in the presence of dibutyltin laurate as a catalyst. Upon confirmation of the disappearance of an absorption peak derived from an isocyanate group at 2200 $cm^{-1}$ by IR analysis of the reaction product, the reaction was terminated.

The urethane-modified acrylate resin solution thus obtained had a nonvolatile content of 41.0% and a viscosity of 130 mPa (30° C.), and the resin had a molecular weight as measured by GPC using polystyrene as a standard (solvent: THF) of 35,000, an average number of double bonds per polymer molecule of 13.8% by mole, and an acid value of 0 (mg KOH/g).

Examples B1 to B4

The following four photocurable resin compositions A to D to be used in the present invention were prepared using the resin solution prepared in Production Example B1.

| Composition A: | |
|---|---|
| Resin solution prepared in Production Example B1 (on solid basis) | 100 pts. |
| Silicone: amino-modified reactive silicone oil (side chain modification type) (KF-860, manufactured by The Shin-Etsu Chemical Co., Ltd) | 1 pt. |
| Polyfunctional monomer (NK Oligo U-15HA, manufactured by Shin-Nakamura Chemical Co., Ltd.) | 10 pts. |
| Urethane acrylate (Shiko UV-3200B, manufactured by Nippon Synthetic Chemical Industry Co., Ltd.) | . . . |
| Photosensitizer (Irgacure 907, manufactured by Ciba Specialty Chemicals, K.K.) | 5 pts. |

A mixture of the above ingredients was diluted with methyl ethyl ketone (MEK) to prepare a composition having a solid content of 50%.

| Composition B: | |
|---|---|
| Resin solution prepared in Production Example B1 (on solid basis) | 100 pts. |
| Silicone: trimethylsiloxysilicic acid-containing methylpolysiloxane (KF-7312, manufactured by The Shin-Etsu Chemical Co., Ltd) | 1 pt. |
| Polyfunctional monomer (SR-399, manufactured by Sartomer) | 10 pts. |
| Urethane acrylate (Shiko UV-3000B, manufactured by Nippon Synthetic Chemical Industry Co., Ltd.) | 10 pts. |
| Photosensitizer (Irgacure 907, manufactured by Ciba Specialty Chemicals, K.K.) | 5 pts. |

A mixture of the above ingredients was diluted with methyl ethyl ketone (MEK) to prepare a composition having a solid content of 50%.

| Composition C: | |
|---|---|
| Resin solution prepared in Production Example B1 (on solid basis) | 100 pts. |
| Silicone: methacryl-modified silicone oil (X-22-164B, manufactured by The Shin-Etsu Chemical Co., Ltd) | 1 pt. |
| Polyfunctional monomer (NK Oligo U-15HA, manufactured by Shin-Nakamura Chemical Co., Ltd.) | 10 pts. |
| Urethane acrylate (Shiko UV-3520TL, manufactured by Nippon Synthetic Chemical Industry Co., Ltd.) | 15 pts. |
| Photosensitizer (Irgacure 907, manufactured by Ciba Specialty Chemicals, K.K.) | 5 pts. |

A mixture of the above ingredients was diluted with methyl ethyl ketone (MEK) to prepare a composition having a solid content of 50%.

| Composition D: | |
|---|---|
| Resin solution prepared in Production Example B1 (on solid basis) | 100 pts. |
| Silicone: amino-modified reactive silicone oil (KF-8012, manufactured by The Shin-Etsu Chemical Co., Ltd) | 3 pt. |
| Urethane acrylate (Shiko UV-3000B, manufactured by Nippon Synthetic Chemical Industry Co., Ltd.) | 15 pts. |
| Photosensitizer (Irgacure 651, manufactured by Ciba Specialty Chemicals, K.K.) | 5 pts. |

A mixture of the above ingredients was diluted with methyl ethyl ketone (MEK) to prepare a composition having a solid content of 50%.

Each of the four photocurable resin compositions and a photocurable resin composition prepared in Comparative Example B1 below were coated onto a polyethylene terephthalate (PET) film (Diafoil T-600, manufactured by Diafoil Hoechst Co., Ltd.) (one side of which had been treated for bringing the side to an easy adhesion type) in its treated side at a coverage of 50 to 100 μm on a dry basis, and the coating was cured by ultraviolet irradiation in the same manner as in the following examples. The cured resin film was separated from the PET film, and the Young's modulus at 1% elongation at 25° C. and the Young's modulus at 1% elongation at 120° C. were measured. The Young's modulus of the PET film was also measured. The results of the measurement are shown in Table 1.

In the present invention, the Young's modulus was measured by the following method.

[Method for measurement of Young's modulus]
Specimen: Strip specimen having a size of 5 mm in width×50 to 100 µm in thickness
(1) 25° C.
Tensilon universal tester RTA-100 (manufactured by ORIENTEC) was used to self-record a strain-stress curve at a tensile speed of 2 mm/min, and the stress per unit sectional area was determined from the stress at 1% elongation and was regarded as the Young's modulus at 1% elongation.
(2) 120° C.
A solid elastic analyzer RSA-II (manufactured by Rheometrix Corp.) was used to self-record a strain-stress curve at a tensile speed of $3.5 \times 10^{-4}$/sec (measurement mode: STRAIN RATE SWEEP), and the stress per unit sectional area was determined from the stress at 1% elongation and was regarded as the Young's modulus at 1% elongation.

TABLE 1

|  | Young's modulus at 1% elongation (MPa) | |
| --- | --- | --- |
|  | 25° C. | 120° C. |
| PET film | 2300 | 350 |
| Ex. B1 (cured composition A) | 590 | 14 |
| Ex. B2 (cured composition B) | 740 | 12 |
| Ex. B3 (cured composition C) | 500 | 7.5 |
| Ex. B4 (cured composition D) | 600 | 10 |
| Comp. Ex. B1 (cured composition E) | 3000 | 600 |

Examples B5 to B8

Figure 6:
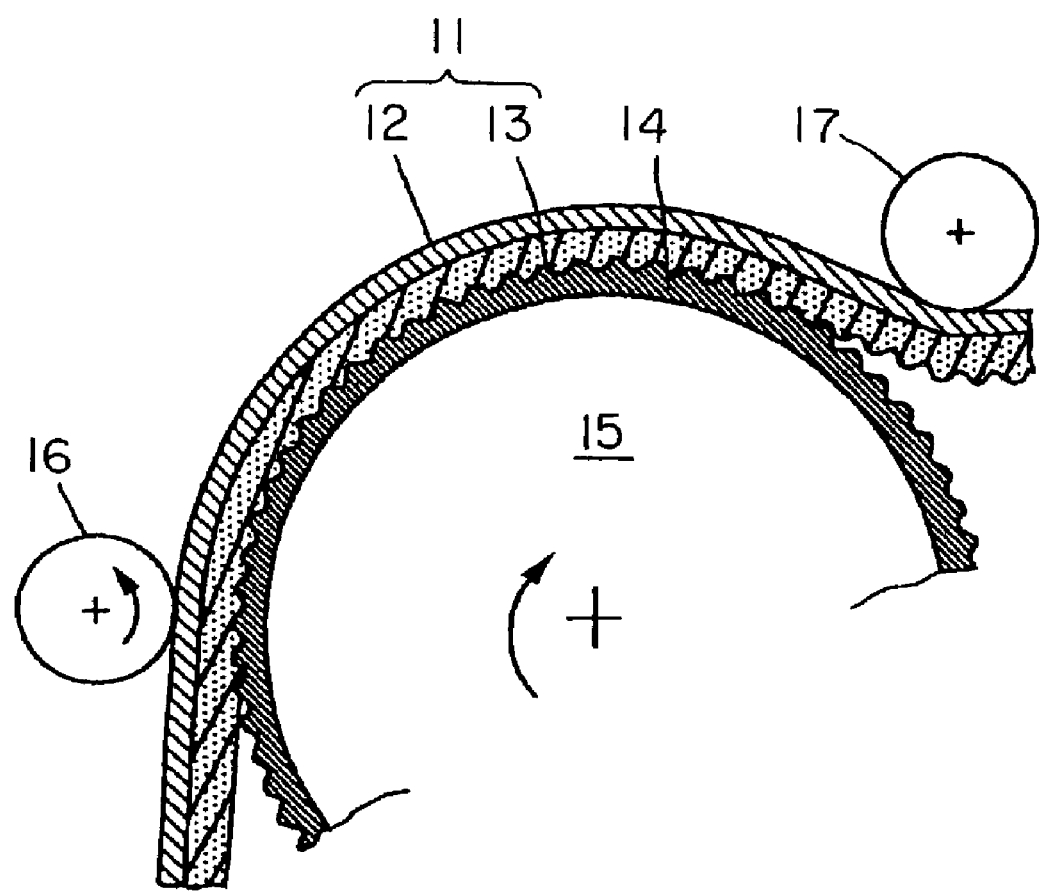
FIG. 6 is a diagram illustrating a method for forming concaves and convexes used in working examples.

(Duplication of Holograms)
Duplication of holograms was carried out using a continuous duplicator shown in FIG. 6 as described in Japanese Patent Laid-Open No. 156273/1986.

In FIG. 6, each number shows the following portion.
11: hologram-forming film
12: substrate film
13: curable resin
14: original plate of hologram
15: embossing roller
16: pressure roller
17: guide roller The four photocurable resin compositions each were roll coated at a speed of 20 m/min on a 50-µm polyester terephthalate film (Diafoil T-600, manufactured by Diafoil Hoechst Co., Ltd.), one side of which had been treated for improving the adhesion, in its treated surface. The coatings were dried at 100° C. to vaporize the solvent to obtain photosensitive films for duplication at a coverage of 2 g/m² on a dry film basis. All the films thus obtained were not tacky at room temperature, and could be stored in a roll form.

The duplicator had an emboss roller provided with a press stamper which had been prepared continuously from a master hologram prepared using a laser beam. Alternatively, a duplicated hologram may be prepared in a resin plate from a master hologram and applied onto a cylinder.

The photosensitive films for duplication prepared above were set on the sheet feed side, followed by heat pressing at 150° C. to form fine concave-convex patterns. Subsequently, ultraviolet light was applied to perform photocuring. An aluminum layer was then vapor deposited thereon by vacuum deposition to prepare reflection type relief holograms.

A liquid for an adhesive layer (NISSETSU PE-118+CK101, manufactured by Nippon Carbide Industries Co., Ltd.) was roll coated on the surface thereof, and dried at 100° C. to vaporize the solvent. A silicone-treated PET film (SPO 5, manufactured by Tohcello Co., Ltd.) as a release film was laminated thereon to obtain adhesive layers at a coverage of 25 g/m² on a dry film basis. They are in a label form and can be used in prints, displays or the like for showing three-dimensional images.

Examples B9 to B12

(Formation of Diffraction Gratings)
In these examples, the same duplicator as used in the duplication of a hologram and shown in FIG. 6 (as described in Japanese Patent Laid-Open No. 156273/1986) was used.

Each of the four photocurable resin compositions was roll coated at a speed of 20 m/min on a 50-µm polyester terephthalate film (Diafoil T-600, manufactured by Diafoil Hoechst Co., Ltd.), one side of which had been treated for improving the adhesion, in its treated surface. The coatings were dried at 100° C. to vaporize the solvent to obtain photosensitive films for duplication at a coverage of 2 g/m² on a dry film basis. All the films thus obtained were not tacky at room temperature, and could be stored in a roll form.

The duplicator had an emboss roller provided with a press stamper prepared continuously from a master diffraction grating written using an electron beam. Alternatively, a duplicated diffraction grating may be prepared in a resin plate from a master diffraction grating, and applied onto a cylinder.

The photosensitive films for duplication prepared above were set on the sheet feed side, followed by heat pressing at 150° C. to form fine concave-convex patterns. Subsequently, ultraviolet light was applied from a mercury lamp in the same manner as used in Examples B5 to B8 to perform photocuring. An aluminum layer was then vapor deposited thereon by vacuum deposition to prepare reflection type diffraction grating.

A liquid for an adhesive layer (NISSETSU PE-118+CK101, manufactured by Nippon Carbide Industries Co., Ltd.) was roll coated on the surface thereof, and dried at 100° C. to vaporize the solvent. A silicone-treated PET film (SPO 5, manufactured by Tohcello Co., Ltd.) as a release film was laminated thereon to obtain adhesive layers at a coverage of 25 g/m² on a dry film basis. They are in a label form and can be used in prints, displays or the like for showing three-dimensional images.

Examples B13 to B16

(Formation of Holograms by Transfer)
A liquid for a release layer was gravure coated at a speed of 20 m/min on a 25-µm polyethylene terephthalate film (Lumirror T60, manufactured by Toray Industries, Inc.), and dried at 100° C. to vaporize the solvent to obtain a film having a layer construction of release layer (coverage 1 g/m² on a dry film basis)/PET.

The release layer is a layer which, upon transfer of a transfer film on an object, is transferred onto the surface of the object to constitute the outermost layer. The release layer is provided for improving, for example, the releasability and transferability of the transfer layer, and may be made of various conventional materials according to the kind of the substrate film. Materials for the release layer include, for example, polymethacrylic ester resin, polyvinyl chloride resin, cellulose resin, silicone resin, chlorinated rubber, casein, various surfactants, and metal oxides. They may be used alone or as a mixture of two or more.

In particular, preferably, in the formation of the release layer, the material and the like are properly selected so that the force necessary for peeling the transfer layer from the substrate film is 1 to 5 g/in. (90° peel test). The release layer may be formed on the surface of the substrate film by preparing an ink for the release layer and applying the ink onto the surface of the substrate film by a conventional method, such as coating. The thickness of the release layer is preferably 0.1 to 2 µm from the viewpoint of the peel force, transferability and the like.

The four photocurable resin compositions of the present invention prepared above each were roll coated on the film having a layer construction of release layer/PET in its release layer. The coatings were dried at 100° C. to vaporize the solvent to obtain photosensitive films for duplication at a coverage of 2 g/m$^2$ on a dry film basis. All the films thus obtained were not tacky at room temperature, and could be stored in a roll form.

The duplicator had an emboss roller provided with a press stamper which had been prepared continuously from a master hologram prepared using a laser beam. Alternatively, a duplicated hologram may be prepared in a resin plate from a master hologram and applied onto a cylinder. The photosensitive films for duplication prepared above were set on the sheet feed side, followed by heat pressing at 150° C. to form fine concave-convex patterns. Subsequently, ultraviolet light was applied from a mercury lamp in the same manner as used in Examples B5 to B8 to perform photocuring. An aluminum layer was then vapor deposited thereon by vacuum deposition to prepare reflection type relief holograms. An ink for an adhesive layer was gravure coated on the surface thereof, and the coating was dried at 100° C. to vaporize the solvent to obtain an adhesive layer at a coverage of 1 g/m$^2$ on a dry film basis.

Heat-sensitive adhesive resins for the adhesive layer include conventional heat-sensitive adhesive resins, for example, rubbers, such as polyisoprene rubber, polyisobutylene rubber, and styrene-butadiene rubber; (meth)acrylic esters, such as polymethyl (meth)acrylate, polyethyl (meth)acrylate, polypropyl (meth)acrylate, polybutyl (meth)acrylate, and poly-2-ethylhexyl (meth)acrylate; polyvinyl ethers, such as polyisobutyl ether; polyvinyl acetate; polyvinyl chlorides, such as vinyl chloride/vinyl acetate copolymer; polyamides, such as polyacrylamide and polymethylolacrylamide; vinyl chloride resins, such as polyvinyl chloride; polystyrene; polyester; polyolefin chloride; polyvinyl butyral; and other resins, such as vinyl acetate/octyl acrylate resin, vinyl acetate/butyl acrylate resin, and vinylidene chloride/butyl acrylate resin.

Any film may be used as the film for coating so far as the film has transferability and releasability. For example, biaxially stretched polyethylene terephthalate (PET) films are most preferred from the viewpoint of dimensional stability, heat resistance, toughness and the like. In addition to the PET films, polyvinyl chloride films, polypropylene films, polyethylene films, polycarbonate films, cellophane, polyvinyl alcohol films, acetate films, nylon films, polyamide films, polyamide-imide films, ethylene/vinyl alcohol copolymer films, fluorine-containing films, various co-extruded films and the like may also be used. The thickness of the film is generally 5 to 200 µm, preferably 10 to 50 µm.

Thermal transfer was carried out on a plywood by applying a hot roll to the film side of the assembly with the acrylic adhesive facing the plywood. Next, the release film was separated, and ultraviolet light was applied from a mercury lamp to cure the resin as the surface layer. Thus, transfer films were obtained. They can be used in prints, displays or the like for showing three-dimensional images. Thermal transfer onto a vinyl chloride card was carried out by means of a transfer device. As a result, the transferability was good, and the adhesion was excellent.

Comparative Example B1

A photocurable composition E was prepared which comprised the same components as the photocurable composition A, except that the same amount of an oligomer (BPEFA, manufactured by Osaka Gas Co., Ltd.) was used instead of the resin used in the photocurable composition A in Example B1 and no silicone oil was used. The composition E was used to conduct the duplication of a hologram, the duplication of a diffraction grating and the formation of a hologram by transfer in the same manner as described above The Young's modulus at 1% elongation at 25° C. and the Young's modulus at 1% elongation at 120° C. were 3,000 MPa and 600 MPa, respectively.

The properties of the cured products of the photocurable resin compositions A to F used in Examples B5 to B20 and Comparative Example B1 (curing conditions being the same as those used in the examples) are shown in Table 2.

The properties were evaluated by the following methods.

Releasability (Releasability from Press Stamper):

The coated film was subjected to continuous duplication by 1000 m by means of a duplicator shown in FIG. 6 (as described in Japanese Patent Laid-Open No. 156273/1986), and the press stamper was then inspected for the deposition of the resin on the press stamper.

◯ . . . Not deposited

X . . . Deposited

Chemical Resistance:

Gauze impregnated with methyl ethyl ketone was reciprocated 100 times on the cured surface to rub the product with the gauze. The product was then inspected for the state of the surface. When the surface was not in an abnormal state, the chemical resistance was evaluated as good. On the other hand, when the surface was in an abnormal state, the chemical resistance was evaluated as failure.

◯ . . . Good

X . . . Failure

Heat Resistance:

The cured surface of the product was heated to 200° C. by means of a hot roll, and then held at that temperature for 3 min. The product was then inspected for a color change, deformation and the like. When there was no abnormal phenomenon, the heat resistance was evaluated as good. On the other hand, when yellowing, deformation or separation occurred, the heat resistance was evaluated as failure.

◯ . . . Good

X . . . Failure

Scratch Resistance:

The cured surface of the product was rubbed ten times with a steel wool of #0000. When there was no change in surface, the scratch resistance was evaluated as good. On the other hand, when the surface was scratched and clouded, the scratch resistance was evaluated as failure.
○ . . . Good
X . . . Failure Suitability for Vapor Deposition:
An aluminum layer was vacuum deposited on a hologram- or diffraction grating-formed surface. The adhesion was then evaluated by a cellophane tape cross-cut test.
○ . . . Good vapor deposition properties
X . . . Poor vapor deposition properties Suitability for Transfer Film:
An aluminum layer was vacuum deposited on a hologram- or diffraction grating-formed surface. An acrylic adhesive for heat sealing (a hot stamping agent) was then coated on the aluminum layer to prepare a transfer film. Transfer onto a polyvinyl chloride card was carried out by means of a transfer device to evaluate the transferability and adhesion of the transfer film.
○ . . . Good
X . . . Failure Flexing Resistance:
Letters were formed by embossing on the transfer film which had been transferred onto the polyvinyl chloride card. The card was then inspected for cracks or other unfavorable defects in the letters formed by embossing.
○ . . . Remained unchanged
X . . . Cracked

TABLE 2

Results of evaluation

| | Composition used | Releasability | Chemical resistance | Scratch resistance | Suitability for deposition | Flexing resistance |
|---|---|---|---|---|---|---|
| Ex. B5 | A | ○ | ○ | ○ | ⊙ | ○ |
| Ex. B6 | B | ○ | ○ | ○ | ⊙ | ○ |
| Ex. B7 | C | ○ | ○ | ○ | ⊙ | ○ |
| Ex. B8 | D | ○ | ○ | ○ | ⊙ | ○ |
| Ex. B9 | A | ○ | ○ | ○ | ⊙ | ○ |
| Ex. B10 | B | ○ | ○ | ○ | ⊙ | ○ |
| Ex. B11 | C | ○ | ○ | ○ | ⊙ | ○ |
| Ex. B12 | D | ○ | ○ | ○ | ⊙ | ○ |
| Ex. B13 | A | ○ | ○ | ○ | ⊙ | ○ |
| Ex. B14 | B | ○ | ○ | ○ | ⊙ | ○ |
| Ex. B15 | C | ○ | ○ | ○ | ⊙ | ○ |
| Ex. B16 | D | ○ | ○ | ○ | ⊙ | ○ |
| Comp. Ex. B1 | E | ○ | X | ○ | ○ | X |

As is apparent from the above examples and comparative examples, according to the present invention, the use of a specific urethane-modified acrylic resin as a main film-forming component of a photocurable resin composition can provide relief and volume holograms or diffraction grating sheets which possess excellent strength, heat resistance, scratch resistance, water resistance, chemical resistance, and adhesion to substrates, and, at the same time, are conformable to flexing or expansion/contraction of objects with the hologram or grating sheet applied thereto.

The invention claimed is:

1. A hologram transfer film comprising:
a substrate film;
a volume hologram-forming layer provided on the substrate film; and
a heat-sensitive adhesive layer provided on the volume hologram-forming layer;
wherein:
the volume hologram-forming layer has a glass transition temperature of at least 100° C.; and
the volume hologram-forming layer has a breaking strain of 0.5 to 15% at 25° C. and a breaking strain of 0.5 to 30% at 120° C.

2. The hologram transfer film according to claim 1, wherein a release layer is provided between the substrate film and the volume hologram-forming layer.

3. The hologram transfer film according to claim 2, wherein a barrier layer is provided between the release layer and the hologram-forming layer.

4. The hologram transfer film according to claim 3, wherein the barrier layer comprises an ionizing radiation-curable resin.

5. The hologram transfer film according to claim 1, wherein the volume hologram-forming layer has a breaking strain of 1 to 10% at 25° C. and a breaking strain of 1 to 15% at 120° C.

6. An article having, on its surface, a hologram layer formed by applying the hologram transfer film according to claim 1.

7. The article according to claim 6, wherein the article is selected from the group consisting of a plastic card, a portable telephone, a note, a gold note, a daily necessity and a CD-ROM package.

8. A process for producing a hologram transfer film, comprising:
providing a first film having a volume hologram-forming layer;
providing a second film having a heat-sensitive adhesive layer; and
laminating the first film and the second film in combination to obtain the hologram transfer film according to claim 1.

9. The process according to claim 8, further comprising:
providing a third film having a release layer;
forming a hologram image in the volume hologram-forming layer of the first film; and
laminating the second film and the third film onto the first film having the hologram image formed thereon.

10. The process according to claim 9, wherein the first, second and third films are laminated using a dry process.

11. The process according to claim 9, wherein:
a volume hologram is recorded in the volume hologram-forming layer of the first film;

the third film is laminated onto the first film to form a laminate;

the laminate is developed; and the second film is laminated onto the developed laminate.

12. The process according to claim 9, wherein a difference in refractive index between the volume hologram-forming layer and the release layer is not more than 0.01.

13. The process according to claim 9, wherein an interlaminar strength between the first, second and third films is controlled.

14. The process according to claim 8, wherein:
the first film further comprises a release layer; and
the first film and the second film are provided in independent steps.

15. The process according to claim 8, further comprising providing a third film comprising a release layer;
wherein the first film and the second film are formed as a single film comprising the volume hologram-forming layer and the heat-sensitive adhesive layer.

* * * * *